(12) United States Patent
Yamamoto et al.

(10) Patent No.: US 12,221,095 B2
(45) Date of Patent: *Feb. 11, 2025

(54) AUTOMATIC PARKING SYSTEM

(71) Applicant: AICHI STEEL CORPORATION, Tokai (JP)

(72) Inventors: Michiharu Yamamoto, Tokai (JP); Tomohiko Nagao, Tokai (JP); Hitoshi Aoyama, Tokai (JP)

(73) Assignee: AICHI STEEL CORPORATION, Tokai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,174

(22) Filed: Sep. 25, 2023

(65) Prior Publication Data

US 2024/0010189 A1    Jan. 11, 2024

Related U.S. Application Data

(63) Continuation of application No. 17/051,456, filed as application No. PCT/JP2019/016552 on Apr. 17, 2019, now Pat. No. 11,801,827.

(30) Foreign Application Priority Data

May 2, 2018    (JP) .................................. 2018-088753

(51) Int. Cl.
  *B60W 30/06*    (2006.01)
  *G05D 1/00*    (2006.01)
  (Continued)

(52) U.S. Cl.
  CPC ........... *B60W 30/06* (2013.01); *G05D 1/0265* (2013.01); *G05D 1/0274* (2013.01);
  (Continued)

(58) Field of Classification Search
  None
  See application file for complete search history.

(56) References Cited

U.S. PATENT DOCUMENTS 5,708,427 A * 1/1998 Bush .................... G05D 1/0261
                                                                340/988
6,336,295 B1   1/2002 Takei
(Continued)

FOREIGN PATENT DOCUMENTS

EP           3508811 A1    7/2019
JP          58-125200 A    7/1983
(Continued)

OTHER PUBLICATIONS

International Search Report for corresponding Application No. PCT/JP2019/016552, mailed Jul. 16, 2019.
(Continued)

*Primary Examiner* — John F Mortell
(74) *Attorney, Agent, or Firm* — Renner, Otto, Boisselle & Sklar, LLP

(57) ABSTRACT

An automatic parking system which controls a vehicle so as to cause the vehicle to be moved to a parking place and accommodated in a parking frame provided in the parking place includes a route where magnetic marker is laid so as to be detectable by using a magnetic sensor array provided to the vehicle, RFID tag providing tag information capable of identifying laying position of the magnetic marker, and a control server device which identifies a vehicle position based on the laying positions of the magnetic markers, allowing highly-accurate identification of the position of the vehicle to be forwarded and allowing operation with high reliability.

20 Claims, 15 Drawing Sheets

(51) Int. Cl.
*G06K 19/07* (2006.01)
*G08G 1/042* (2006.01)
*H04W 4/40* (2018.01)

(52) U.S. Cl.
CPC ......... *G06K 19/0723* (2013.01); *G08G 1/042* (2013.01); *H04W 4/40* (2018.02)

(56) References Cited

U.S. PATENT DOCUMENTS

| | | |
|---|---|---|
| 10,241,519 B2 | 3/2019 | Nagai |
| 2009/0024309 A1* | 1/2009 | Crucs .................. G07C 9/27 340/988 |
| 2012/0197479 A1* | 8/2012 | Bouwman ............... B62D 1/28 701/25 |
| 2014/0309812 A1 | 10/2014 | Lee et al. |
| 2015/0100193 A1* | 4/2015 | Inagaki ............. B62D 15/0285 701/23 |
| 2017/0060133 A1 | 3/2017 | Seo et al. |
| 2017/0169712 A1* | 6/2017 | Penilla ................. H04W 4/024 |
| 2018/0350234 A1* | 12/2018 | Myers .................... G08G 1/017 |
| 2019/0098468 A1 | 3/2019 | Yamamoto et al. |
| 2019/0155305 A1 | 5/2019 | Yamamoto |

FOREIGN PATENT DOCUMENTS

| | | |
|---|---|---|
| JP | 4-290199 A | 10/1992 |
| JP | 2000-87582 A | 3/2000 |
| JP | 2015-69429 A | 4/2015 |
| JP | 2015-72651 A | 4/2015 |
| WO | 2015/074019 A2 | 5/2015 |
| WO | 2017/187879 A1 | 11/2017 |
| WO | 2017/187881 A1 | 11/2017 |
| WO | 2018/043272 A1 | 3/2018 |

OTHER PUBLICATIONS

Allowed Claims from Parent U.S. Appl. No. 17/051,456, allowed on Jun. 30, 2023.
Extended European Search Report for corresponding Application EP19795970.3 dated Jan. 31, 2022.

* cited by examiner

[FIG.1]
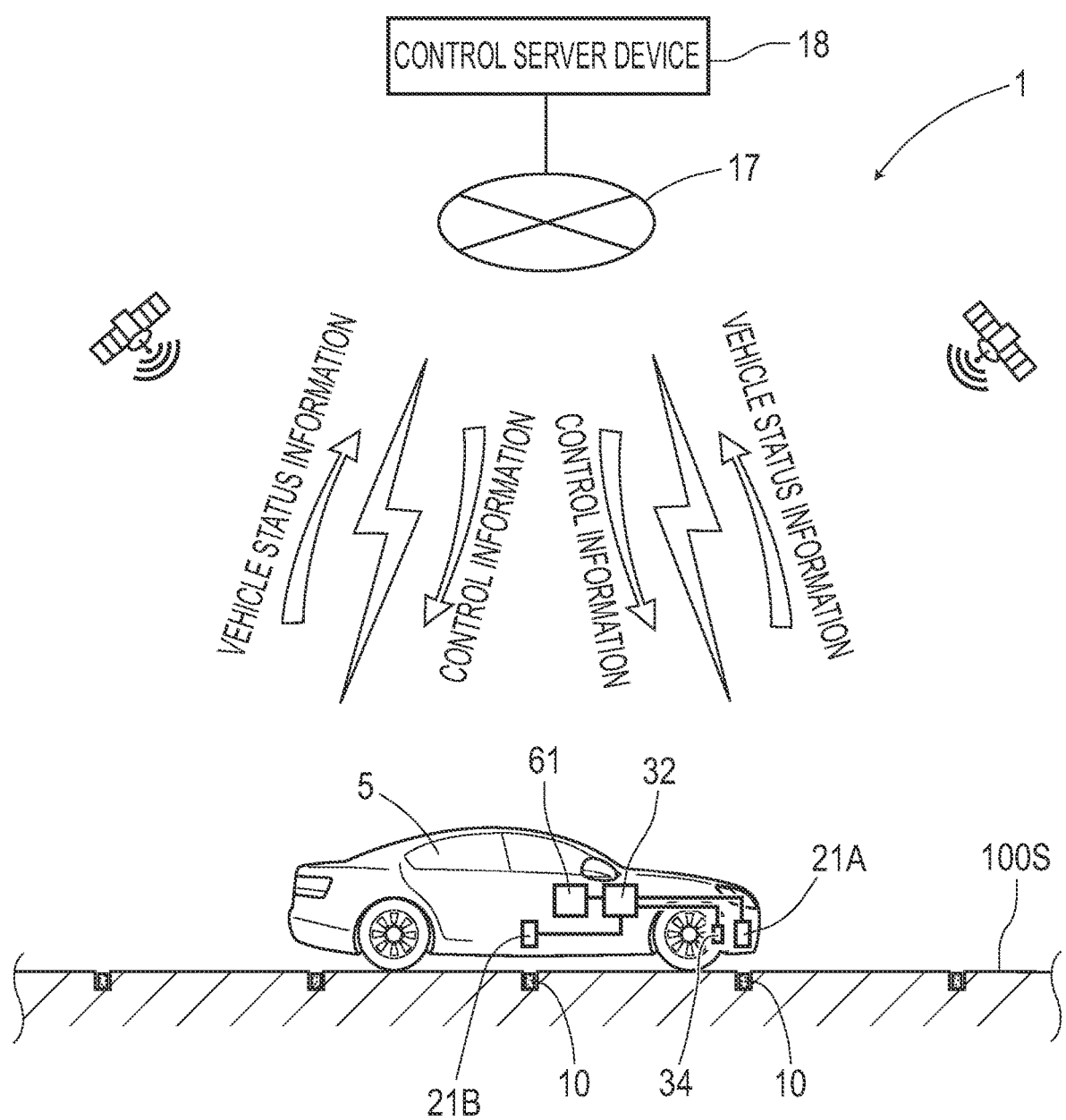

[FIG.2]
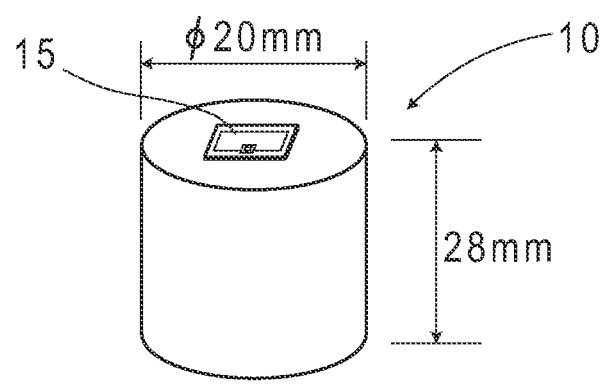

[FIG.3]
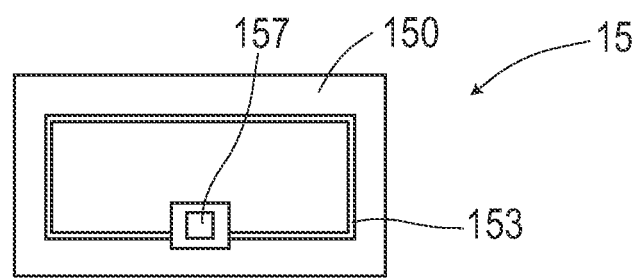

[FIG.4]
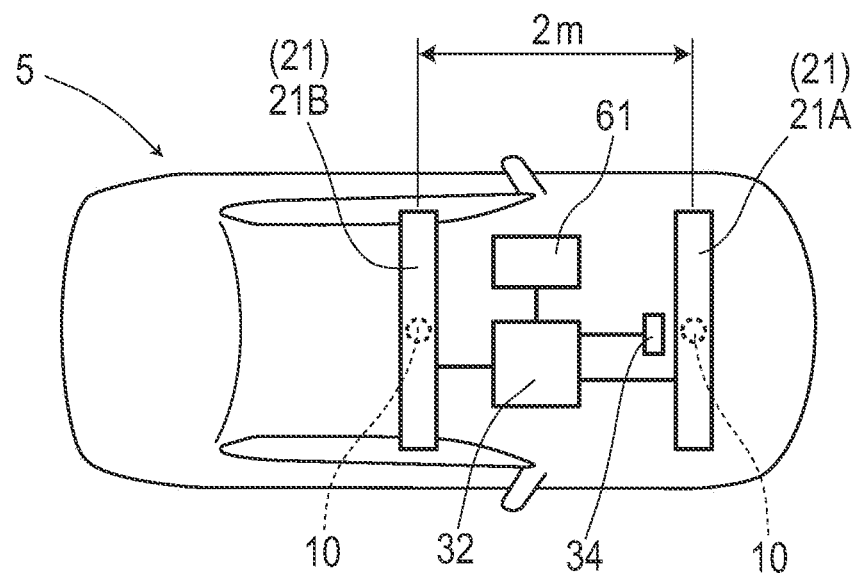

[FIG.5]
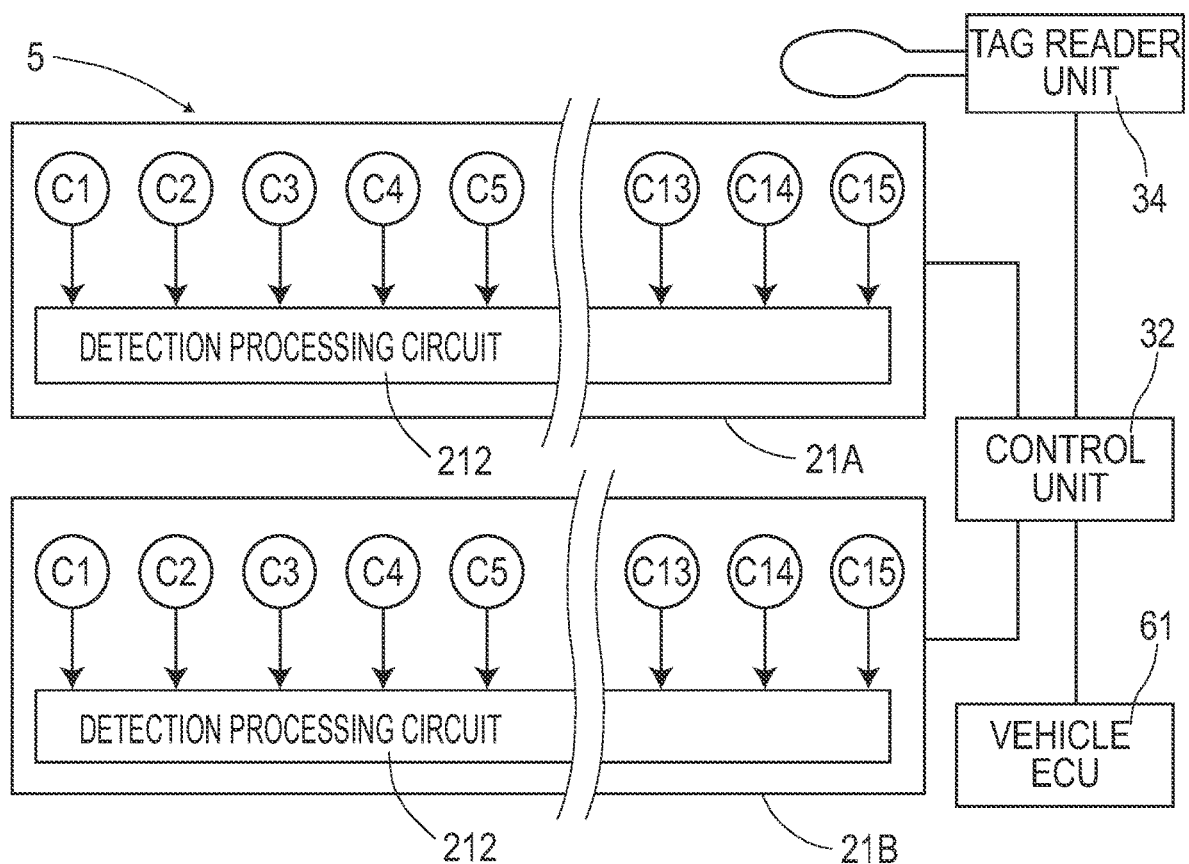

[FIG.6]
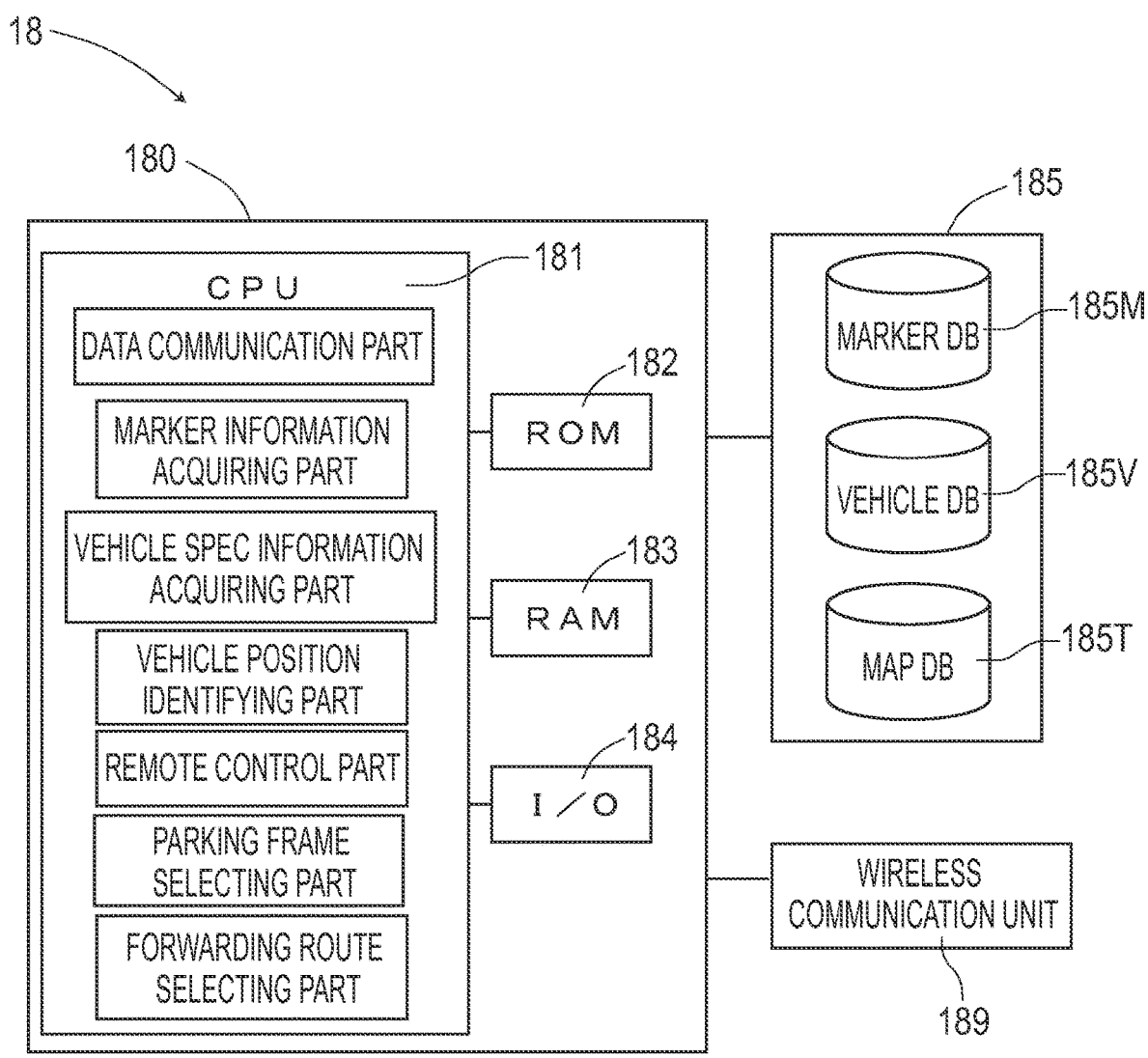

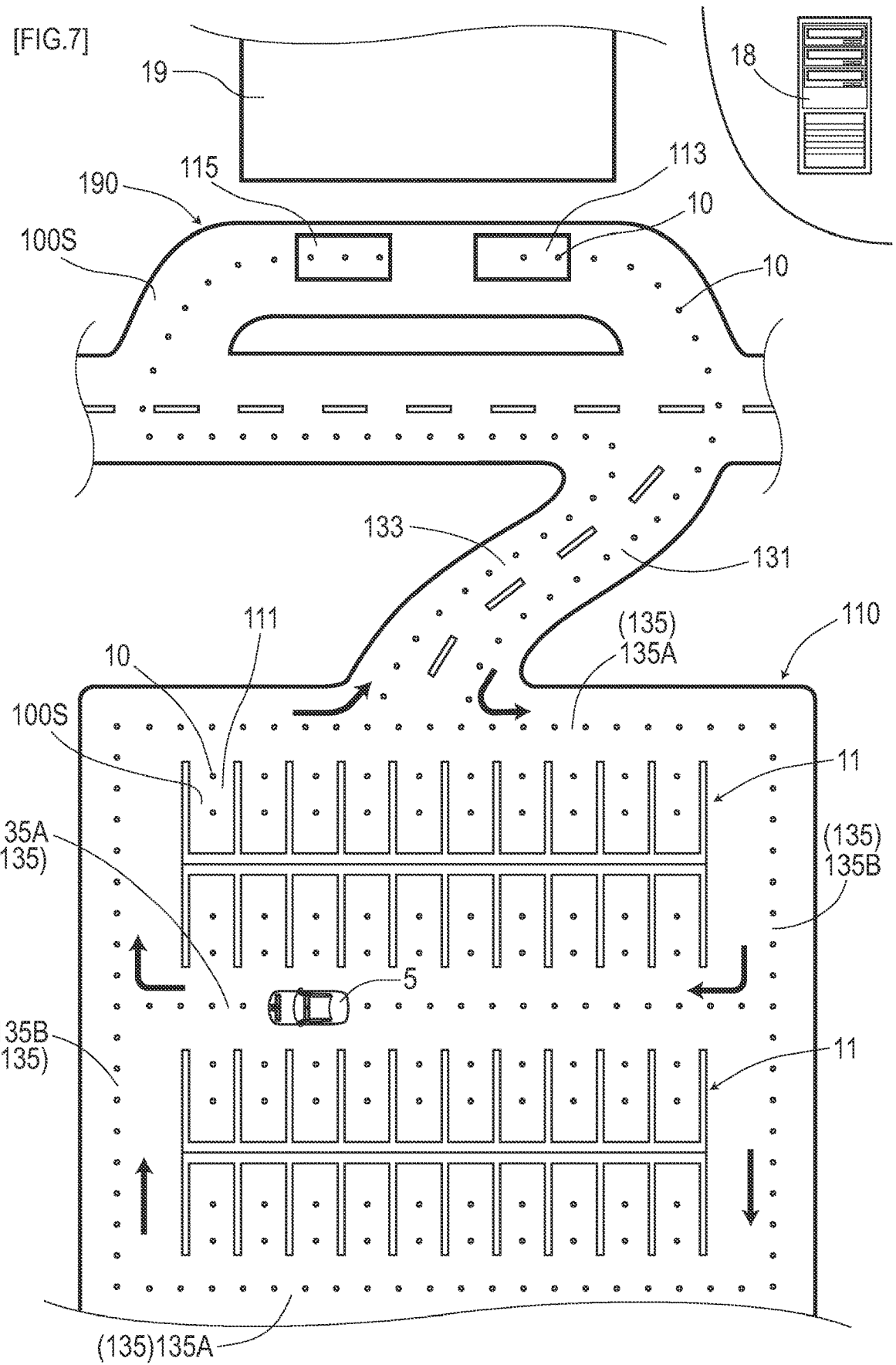

[FIG.8]
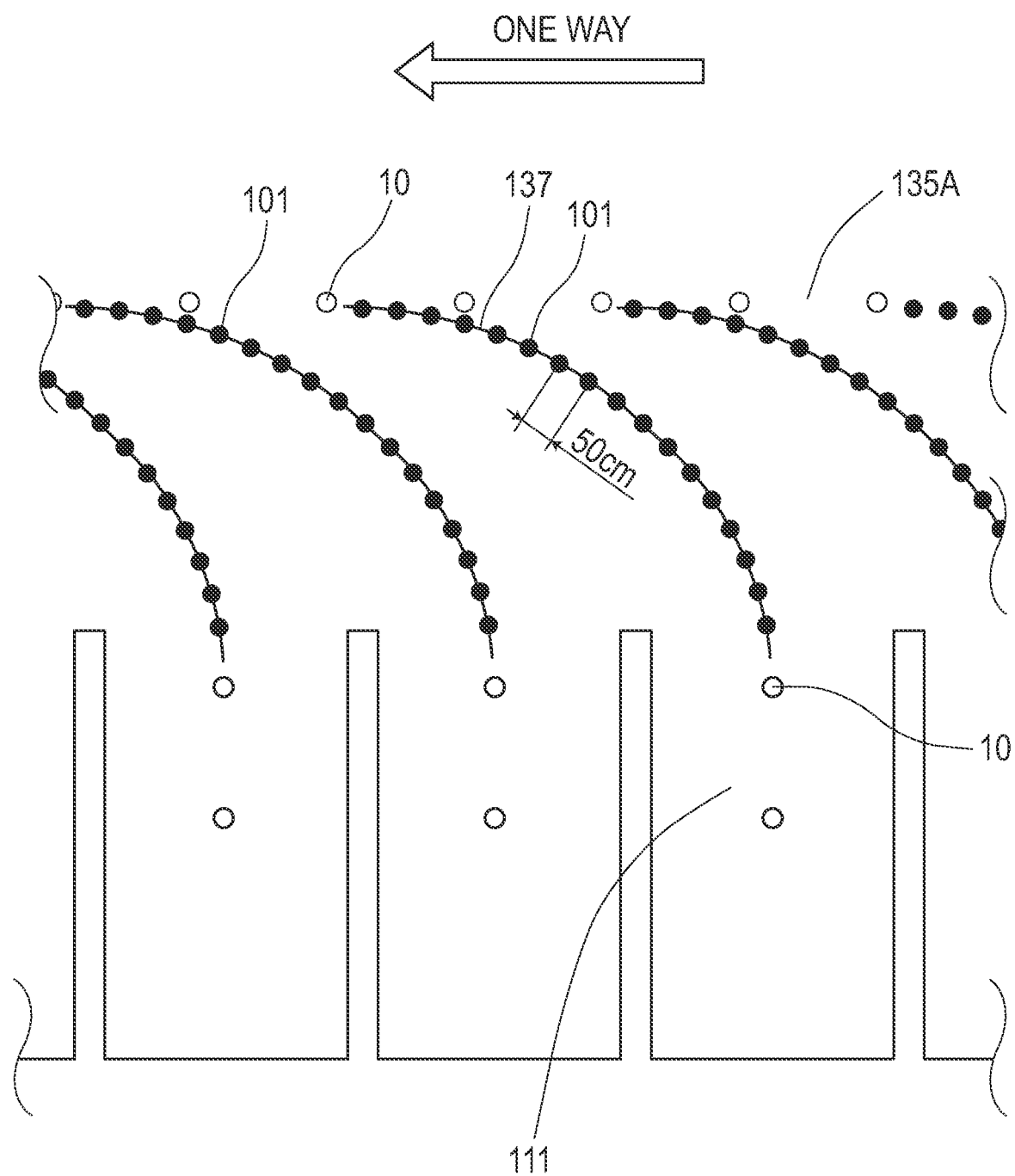

[FIG.9]
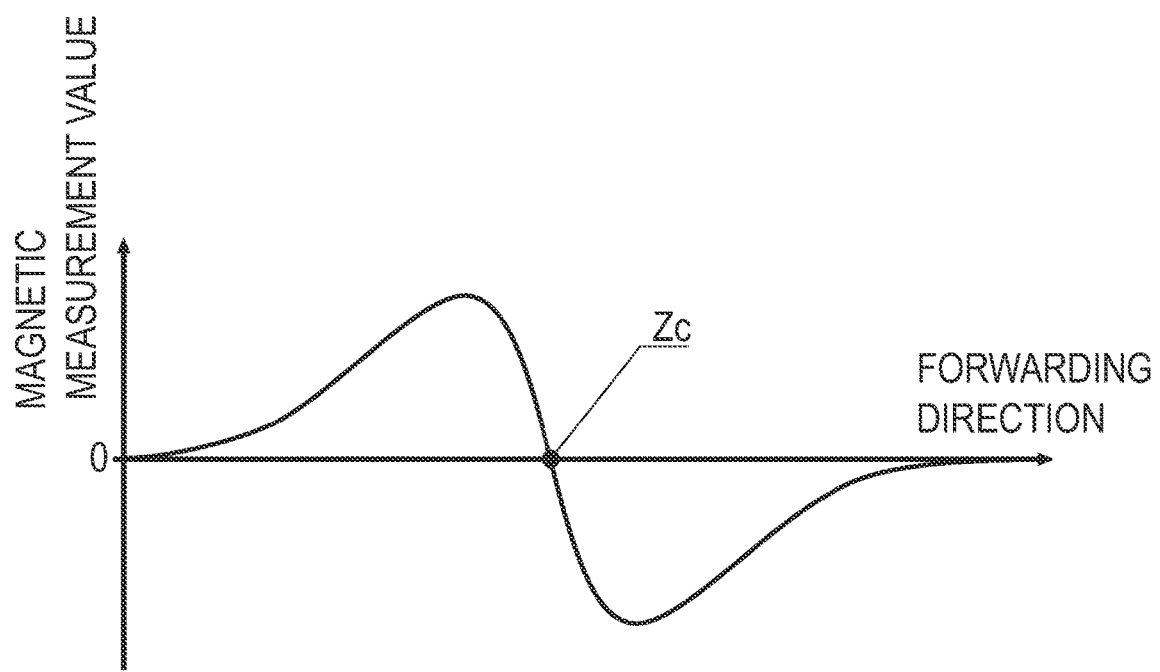

[FIG.10]
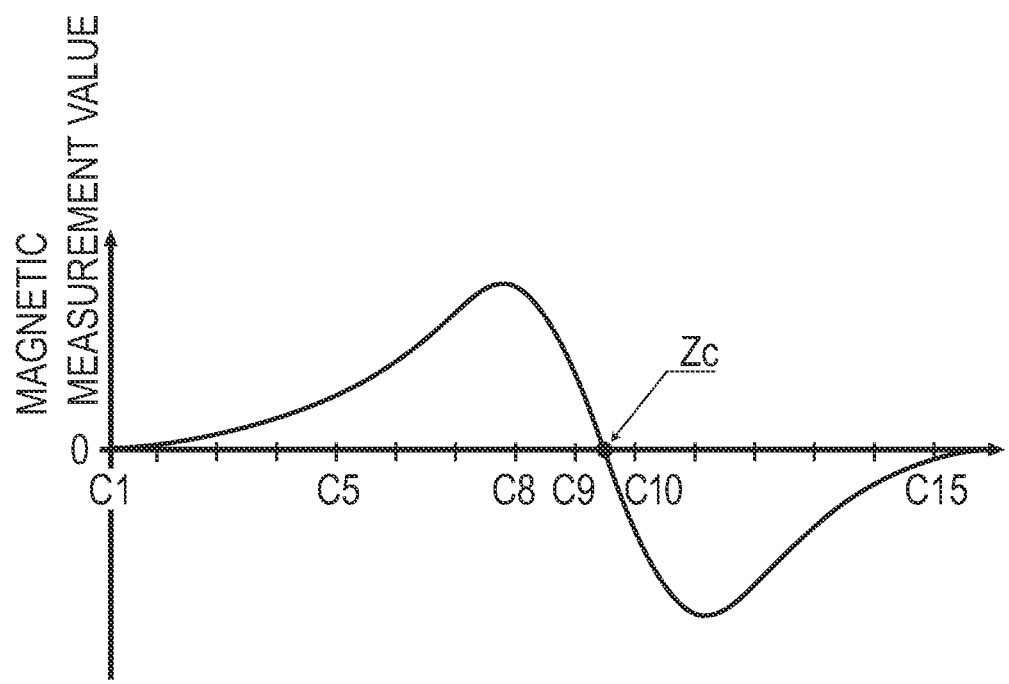

[FIG.11]
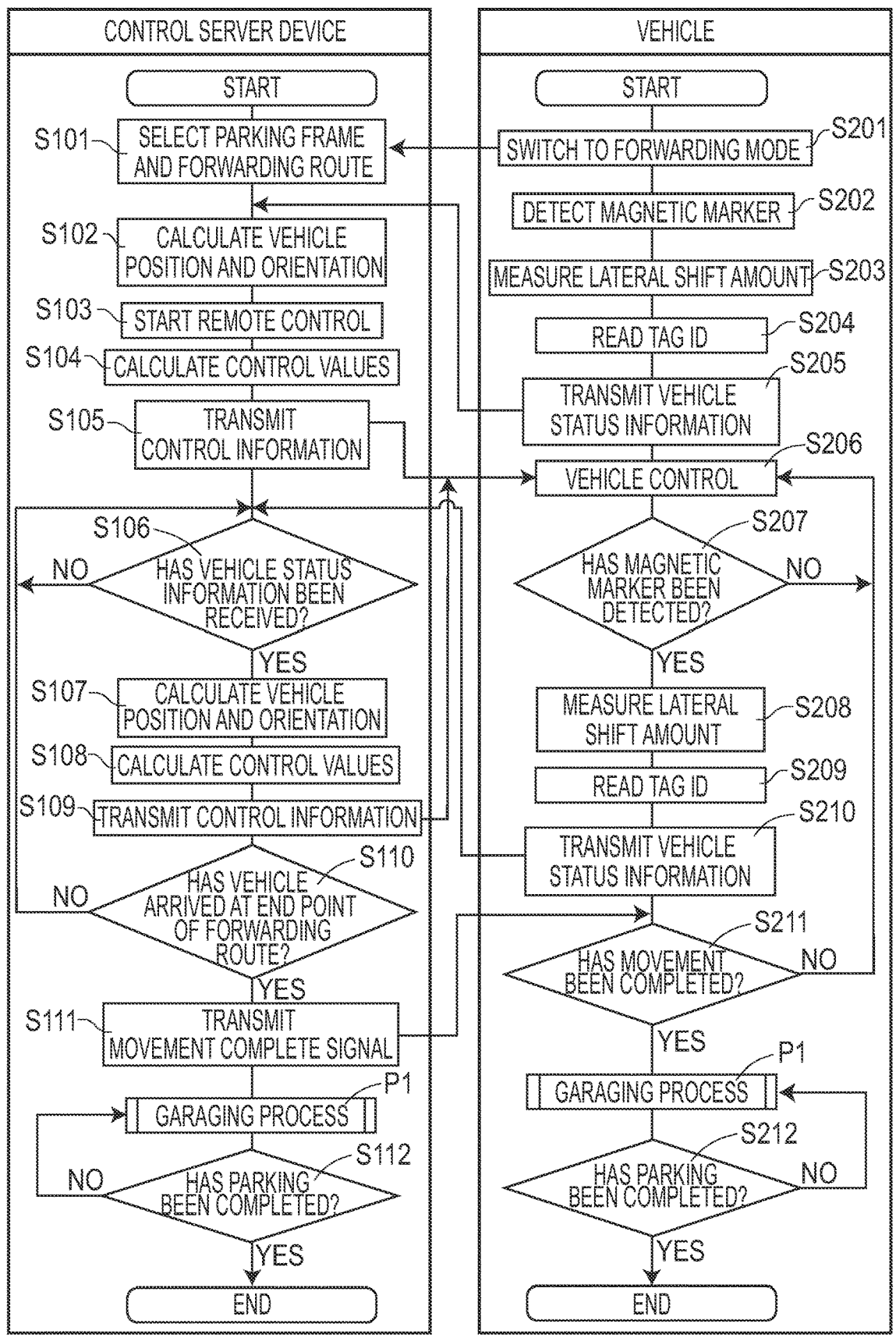

[FIG.12]
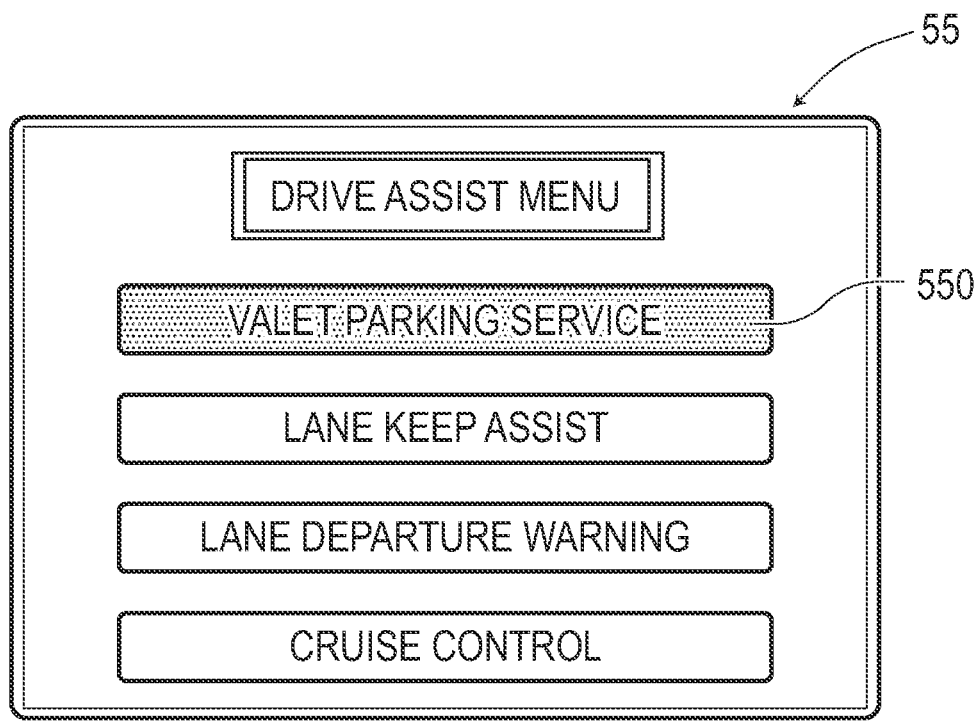

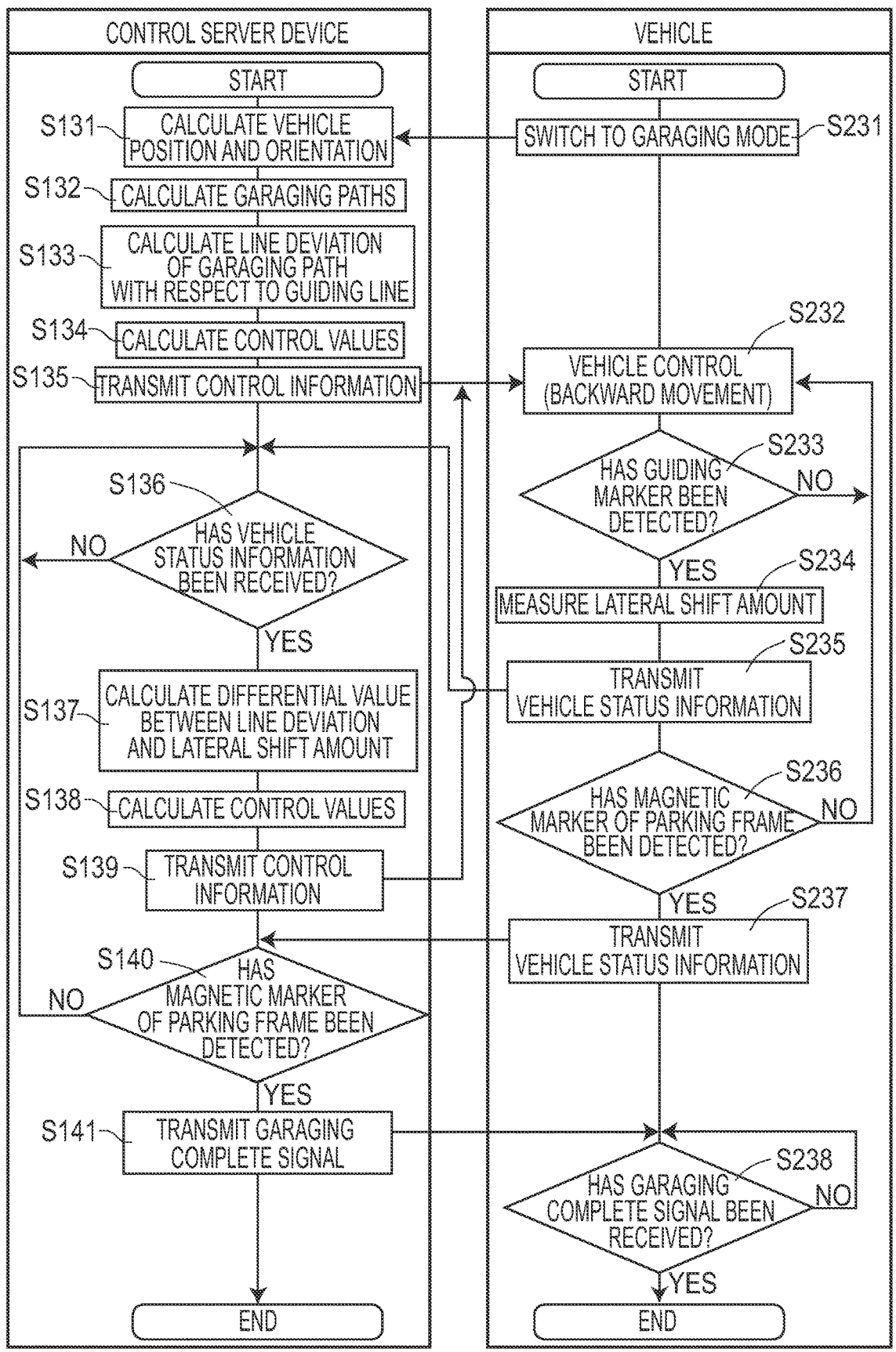

[FIG.14]
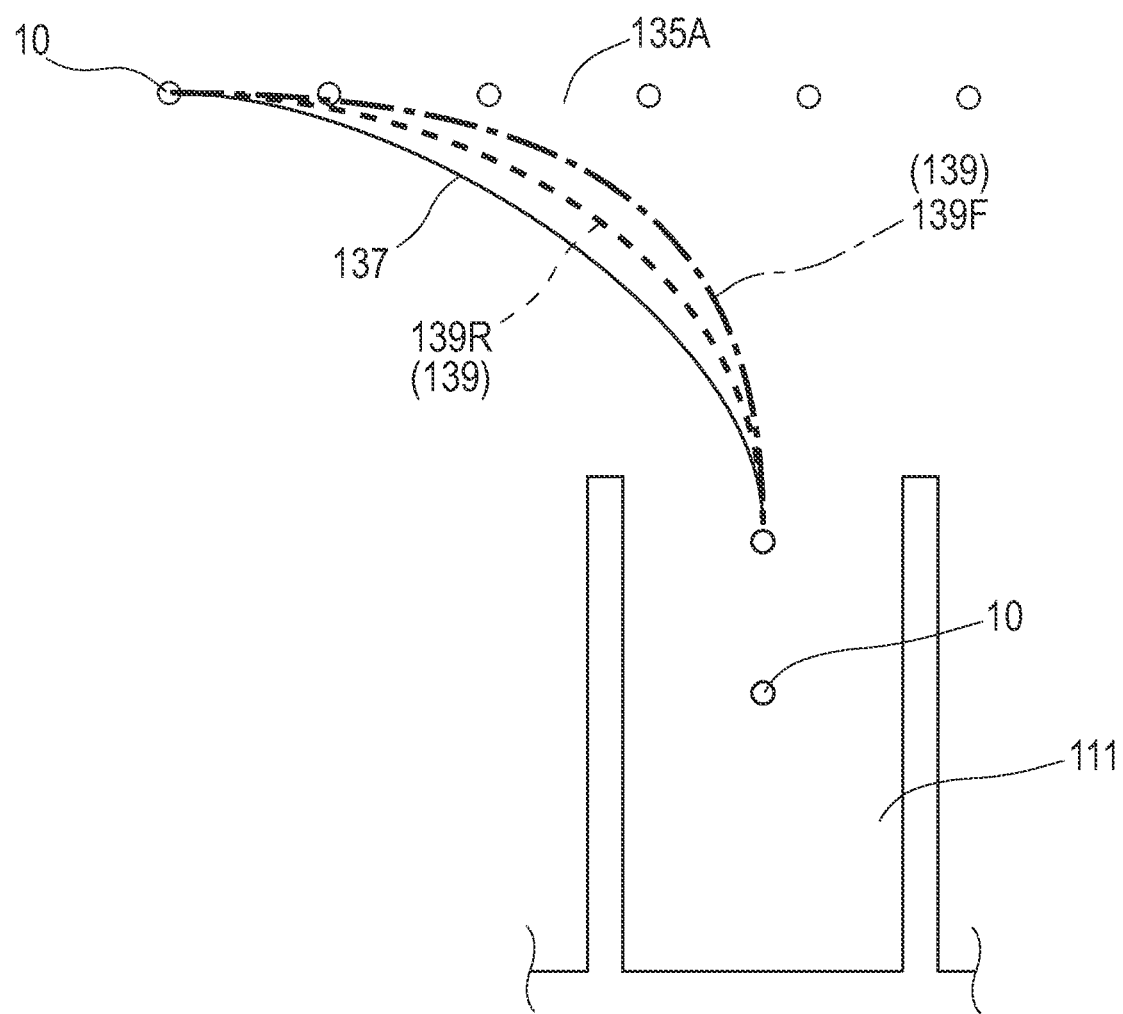

[FIG.15]
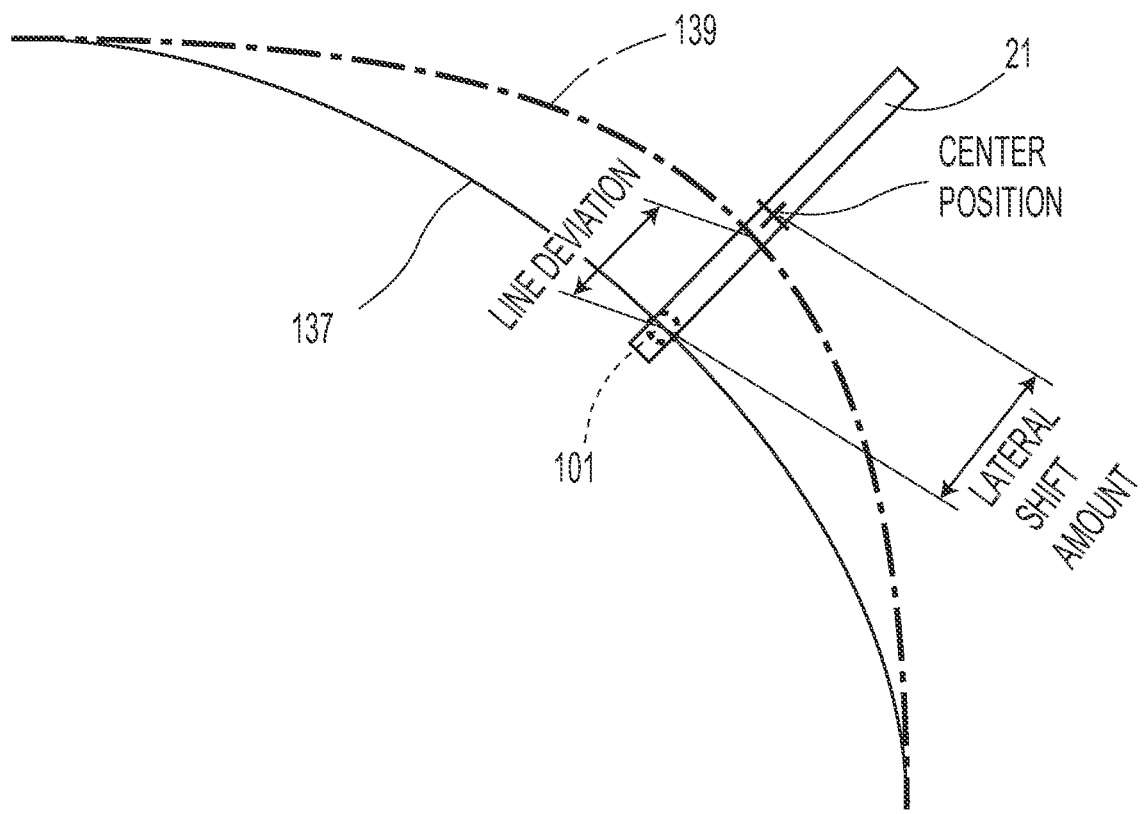

AUTOMATIC PARKING SYSTEM

CROSS-REFERENCE TO RELATED APPLICATIONS

This is a continuation under 35 USC § 120 of U.S. patent application Ser. No. 17/051,456, filed Oct. 29, 2020, which is a National Stage under 35 USC § 371 of International Application No. PCT/JP2019/016552, filed Apr. 17, 2019, and claims priority under 35 USC § 119 to Japanese Patent Application No. 2018-088753, filed May 2, 2018, the entire disclosures of which are hereby incorporated herein by reference.

TECHNICAL FIELD

The present invention relates to an automatic parking system for causing a vehicle to be automatically parked in a parking frame.

BACKGROUND ART

Conventionally, first-class hotels and others have offered valet parking service, accepting keys of automobiles from users who drove the automobiles to an entrance to forward the automobiles to a parking place and to forward the automobiles to the entrance by the time when the users are scheduled to leave. And, in recent years, an automatic parking system has been suggested for achieving the valet parking service by automatic traveling of automobiles (for example, refer to Patent Literature 1).

If such an automatic parking system is achieved, for example, when users visit a facility such as a hotel or shopping center by automobile, efforts and burdens on a user side can be reduced, for example, efforts for finding a parking space, driving burdens for garaging, and burdens of returning from the parking space to an entrance of the facility on foot. Furthermore, for a facility operation side such as a hotel or a shopping center, it is possible to provide a parking space away from the facility or the like. While hotels, shopping centers, and others are suitably built at bustling places or places with convenience for transportation and they are often built at places at relatively high land price, if a necessity of providing parking spaces nearby can be reduced, cost for getting hold of parking spaces can be decreased.

CITATION LIST

Patent Literature

Patent Literature 1: Japanese Unexamined Patent Application Publication No. 2017-182263

SUMMARY OF INVENTION

Technical Problem

However, in the automatic parking system of forwarding automobiles to a parking place for automatic garaging, a position of the vehicle to be forwarded is required to be identified with high accuracy. On the other hand, if an accuracy of a vehicle position is insufficient, system operation with high reliability may be difficult.

The present invention was made in view of the above-described conventional problem, and is to provide an automatic parking system capable of identifying the position of a vehicle to be forwarded with high accuracy and operable with high reliability.

Solution to Problem

The present invention resides in an automatic parking system which controls a vehicle so as to cause the vehicle to be moved to a parking place and to be accommodated in a parking frame provided in the parking place, the system including:

a route where a magnetic marker forming a magnetism generation source is laid so as to be detectable by using a magnetic detecting part provided to the vehicle;

a position information providing part which provides position identification information capable of identifying a laying position of the magnetic marker; and a position identifying part which identifies a vehicle position where the vehicle is located based on the laying position of the magnetic marker.

Advantageous Effects of Invention

The automatic parking system of the present invention is configured to include the route where the magnetic marker that can be detected by the vehicle is laid. Also this automatic parking system includes the position information providing part which provides position identification information capable of identifying laying position of the magnetic marker and the position identifying part which identifies the vehicle position based on the laying position of the magnetic marker.

When the vehicle position is identified based on the laying position of the magnetic marker laid in the route, it is relatively easy to ensure accuracy of the vehicle position. And, the automatic parking system of the present invention capable of identifying the vehicle position with high accuracy has an excellent characteristic operable with high reliability and capable of improving user conveniences.

BRIEF DESCRIPTION OF DRAWINGS

FIG. 1 is a system diagram depicting a configuration of an automatic parking system.

FIG. 2 is a perspective view depicting a magnetic marker.

FIG. 3 is a front view depicting an RFID tag.

FIG. 4 is a top view depicting a vehicle.

FIG. 5 is a block diagram depicting an electrical configuration of the vehicle.

FIG. 6 is a block diagram depicting an electrical configuration of a control server device.

FIG. 7 is a diagram depicting a traveling environment of the vehicle in the automatic parking system.

FIG. 8 is a descriptive diagram depicting parking frames and guiding markers.

FIG. 9 is a descriptive diagram exemplarily depicting changes of a magnetic measurement value in a forwarding direction at a time of passing over the magnetic marker.

FIG. 10 is a descriptive diagram exemplarily depicting a distribution of magnetic measurement values in a vehicle-width direction by magnetic sensors Cn arrayed in the vehicle-width direction.

FIG. 11 is a flow diagram depicting a flow of a vehicle forwarding process.

FIG. 12 is a front view exemplarily depicting a drive assist menu screen.

FIG. 13 is a flow diagram depicting a flow of a garaging process.

FIG. 14 is a descriptive diagram depicting a guiding line and a garaging path.

FIG. 15 is a descriptive diagram depicting a line deviation and a lateral shift amount.

DESCRIPTION OF EMBODIMENT

Modes for implementation of the present invention are specifically described by using the following embodiment.

First Embodiment

The present embodiment is an example regarding automatic parking system 1 for achieving so-called valet parking service of forwarding vehicle (automobile) 5 to parking place 110 by automatic traveling of vehicle 5. Details of this are described by using FIG. 1 to FIG. 15.

Automatic parking system 1 of FIG. 1 is configured to include control server device 18 which remotely controls traveling of vehicle 5 and vehicle 5 communicable with control server device 18 via public communication line 17, for example, the Internet or the like. In a route for automatic traveling of vehicle 5, magnetic markers 10 are disposed at, for example, 2 m spacing, along a route direction. In this automatic parking system 1, forwarding of vehicle 5 to parking place 110 (FIG. 7) is achieved by utilizing magnetic markers 10, which are one example of a magnetic generation source.

Vehicle 5 in automatic parking system 1 transmits, as occasion arises, vehicle status information including detection information of magnetic marker 10 and information such as a steering angle to control server device 18. Control server device 18 having received the vehicle status information replies to vehicle 5 as a source of transmitting the vehicle status information with control information for achieving automatic traveling by remote control. In automatic parking system 1, remote control over vehicle 5 is achieved by these communications between vehicle 5 and control server device 18.

In the following, (1) magnetic markers 10, (2) vehicle and (3) control server device 18 configuring automatic parking system 1 are described, and then the configuration of a (4) traveling environment of vehicle 5 is described.

(1) Magnetic Marker

Magnetic marker 10 (FIG. 2) is formed in a columnar shape having, for example, a diameter of 20 mm and a height of 28 mm. This magnetic marker 10 is laid, for example, in a state of being accommodated in a hole provided in road surface 100S (FIG. 1) where vehicle 5 moves. A magnet forming magnetic marker 10 is a ferrite plastic magnet with magnetic powder of iron oxide as a magnetic material dispersed in a polymer material as a base material, and has a characteristic of a maximum energy product (BHmax)=6.4 kJ/cubic meter. This magnetic marker 10 acts with magnetism of a magnetic flux density of 8 µT (microtesla) at a height of 250 mm as an upper limit of a range from 100 mm to 250 mm assumed as an attachment height of magnetic sensor arrays 21A and 21B (refer to FIG. 1) of vehicle 5.

In magnetic marker 10, as in FIG. 2, RFID tag (Radio Frequency IDentification Tag, wireless tag) 15 which wirelessly outputs tag information is laminated and arranged on a surface on a road surface 100S side. RFID tag 15 operates by wireless external power feeding, and externally outputs the tag information such as a tag ID as identification information. RFID tag 15 in the configuration of the present embodiment forms one example of a position information providing part which provides a tag ID (tag information), which is one example of position identification information, capable of identifying a laying position of magnetic marker 10 to a vehicle 5 side.

RFID tag 15 is, as in FIG. 3, an electronic component having IC chip 157 implemented on a surface of tag sheet 150 cut out from, for example, a PET (Polyethylene terephthalate) film. The surface of tag sheet 150 is provided with a printed pattern of antenna 153. Antenna 153 has a combination of an antenna function for power feeding where an exciting current occurs by electromagnetic induction from outside and an antenna function for communications for wireless transmission of information such as position data.

Note in the present embodiment that guiding markers (reference sign 101 in FIG. 8), which will be described further below, are adopted as other magnetic markers for achieving automatic garaging to parking frame 111 (FIG. 7). This guiding marker 101 is the one acquired by removing RFID tag 15 from magnetic marker of FIG. 2. The arrangement, configuration, and so forth of guiding markers 101 will be described in detail further below in (4) traveling environment of vehicle 5 below.

(2) Vehicle

Vehicle 5 targeted by automatic parking system 1 is, as in FIG. 4 and FIG. 5, vehicle 5 including magnetic sensor arrays 21A and 21B which perform detection of magnetic marker 10 and so forth, tag reader unit 34 which acquires the tag ID (tag information) of RFID tag 15, control unit 32, and so forth. Furthermore, vehicle 5 includes vehicle ECU (Electronic Control Unit) 61 which controls a steering unit, an engine throttle, a brake actuator, and so forth not depicted.

Vehicle ECU 61 can perform control of causing vehicle to automatically travel based on control information (control values) acquired from control server device 18. Note that while magnetic sensor array 21A and tag reader unit 34 are depicted in FIG. 4 and FIG. 5 as separate bodies for ease of understanding, a unit with these integrated together may be adopted.

(2.1) Magnetic Sensor Array

In vehicle 5, as in FIG. 4 and FIG. 5, magnetic sensor arrays 21A and 21B are disposed at two locations 2 m away from each other in a longitudinal direction of vehicle 5. Each of magnetic sensor arrays 21A and 21B, which is one example of a magnetic detecting part, is a rod-shaped unit elongated in the vehicle-width direction, and is attached on a bottom surface of vehicle 5 in a state of facing road surface 100S. According to a combination of front-side magnetic sensor array 21A and rear-side magnetic sensor array 21B, two magnetic markers 10 arranged adjacently to each other and 2 m away from each other along the route can be simultaneously detected.

Magnetic sensor arrays 21A and 21B each includes, as in FIG. 5, fifteen magnetic sensors Cn (n is an integer from 1 to 15) arrayed on a straight line along the vehicle-width direction and detection processing circuit 212 having incorporated therein a CPU and so forth not depicted. Note that in magnetic sensor arrays 21A and 21B, fifteen magnetic sensors Cn are equidistantly arranged with 10 cm.

Magnetic sensor Cn is a sensor which detects magnetism by using the known MI effect (Magneto Impedance Effect), in which an impedance of a magnetically sensitive body such as an amorphous wire sensitively changes in accordance with an external magnetic field. In magnetic sensor Cn, magnetically sensitive bodies are arranged along two orthogonal axis directions, thereby allowing detection of magnetism acting in the two orthogonal axis directions. Note in the present embodiment that magnetic sensor Cn is incorporated in magnetic sensor arrays 21A and 21B so as to detect magnetic components in the forwarding direction and the vehicle-width direction.

Magnetic sensor Cn is a high-sensitivity sensor with a measurement range of magnetic flux density of ±0.6 mT and a magnetic flux resolution of 0.02 µT in the measurement range. Here, as described above, magnetic marker 10 can act with magnetism with magnetic flux density equal to or more than 8 µT in a range of 100 mm to 250 mm assumed as an attachment height of magnetic sensors Cn. With magnetic marker 10 acting with magnetism with magnetic flux density equal to or more than 8 µT, detection is possible with high reliability by using magnetic sensor Cn with magnetic flux resolution of 0.02 µT.

Detection processing circuit 212 (FIG. 5) of magnetic sensor arrays 21A and 21B is an arithmetic circuit which performs a marker detection process for detecting magnetic marker 10. This detection processing circuit 212 is configured by using a CPU which performs various calculations not depicted and also memory elements such as a ROM and a RAM and so forth.

Detection processing circuit 212 acquires a sensor signal outputted by each magnetic sensor Cn in a cycle of 3 kHz to perform the marker detection process. And, detection processing circuit 212 inputs a detection result of the marker detection process to control unit 32. Although details are described further below, in this marker detection process, in addition to detection of magnetic marker 10, measurement of a lateral shift amount (one example of a relative position in a width direction) is performed with respect to magnetic marker 10. As the lateral shift amount, for example, a shift amount of a position at a center (center position) of magnetic sensor array 21 with respect to magnetic marker or the like can be adopted. Since the center position of magnetic sensor array 21 corresponds to an approximately center of vehicle in the vehicle-width direction, it can be handled as a lateral shift amount of vehicle 5 with respect to magnetic marker 10. Note that the lateral shift amount can be measured similarly also for guiding marker 101, which will be described further below.

According to the lateral shift amount detected by the front-side magnetic sensor array 21A with respect to magnetic marker and the lateral shift amount detected by the rear-side sensor array 21B with respect to magnetic marker 10, an orientation of vehicle 5 in the direction of the route can be identified. Note that the identification of the orientation of vehicle 5 as described above is performed by control server device 18 which acquires vehicle status information including the lateral shift amount, as will be described further below.

(2.2) Tag Reader Unit

Tag reader unit 34 of FIG. 4 and FIG. 5 is a communication unit which wirelessly communicates with RFID tag 15 held in magnetic marker 10 (FIG. 2). Tag reader unit 34 wirelessly transmits electric power required for an operation of RFID tag 15 to cause RFID tag to operate, and reads the tag ID (tag information), which is identification information of RFID tag 15.

(2.3) Control Unit

Control unit 32 of FIG. 4 and FIG. 5 is a unit which controls magnetic sensor arrays 21A and 21B and tag reader unit 34 and also transmits and receives various information and data to and from control server device 18 (refer to FIG. 1). Control unit 32 transmits vehicle status information to control server device 18 whenever magnetic marker 10 is detected. This vehicle status information is linked to a vehicle ID so that vehicle 5 as a transmission source is identifiable on a control server device 18 side. In exchange for transmission of the vehicle status information, control unit 32 can acquire control information for automatic traveling from control server device 18. The control information (control value) acquired by control unit 32 is inputted to vehicle ECU 61 and applied to control of vehicle 5, thereby achieving remote control of vehicle 5 by control server device 18.

The vehicle status information includes information acquired or generated by using magnetic marker 10 and information indicating a traveling state of vehicles. As the former information, there are the tag ID (tag information) acquired from RFID tag 15 held on magnetic marker 10, the lateral shift amount with respect to magnetic marker 10, and so forth. As the latter information, there are a vehicle speed and a steering angle actually measured, and so forth. Note that the vehicle speed can take a positive or negative value, a positive vehicle speed meaning a speed at a time of forward movement and a negative vehicle speed meaning a speed at a time of backward movement.

(3) Control Server Device

Control server device 18 is, as in FIG. 6, a computer device configured mainly of electronic substrate 180. On electronic substrate 180, electronic components are implemented, such as CPU (Central Processing Unit) 181, ROM (Read Only Memory) 182, and RAM (Random Access Memory) 183. To this electronic substrate 180, storage device (storage medium) 185 such as a hard disk drive, wireless communication unit 189, and so forth are connected via I/O (Input/Output) 184.

Control server device 18 is provided with databases by using a storage area of storage device 185. As databases, there are marker database (marker DB) 185M storing marker information regarding each magnetic marker 10, vehicle database (vehicle DB) 185V storing vehicle spec information regarding vehicle 5 as a control target, and map database (map DB) 185T storing map data regarding routes where vehicle 5 can travel and parking places.

Marker information of each magnetic marker 10 stored in marker DB 185M is linked to (associated with) the tag ID (tag information), which is identification information of RFID tag 15 provided. In the configuration of the present embodiment, by referring to marker DB 185M by using the tag ID, it is possible to identify its corresponding magnetic marker 10. The marker information includes information indicating the laying position, information indicating an attribute of that laying position, regulation information such as a speed limit, and so forth.

The vehicle spec information stored in vehicle DB 185V is information such as vehicle body dimensions, a wheelbase, front and rear overhangs, a minimum radius of turn, and a steering angle gain (ratio of a steering angle with respect to a steering-wheel operation angle) of vehicle 5 for which registration for using the valet parking service by remote control has been completed. In vehicle DB 185V, the vehicle spec information of each vehicle 5 is managed, with the vehicle ID as identification information linked thereto.

The map data stored in map DB 185T is map data including vector data indicating a structure of routes where vehicle 5 is caused to automatically travel by remote control, a structure of arrangement of parking frames in the parking place, and so forth.

In this map data, the laying positions of magnetic markers 10 are mapped on the routes. For example, when vehicle 5 detects any magnetic marker 10, a shape of a route ahead of vehicle 5 can be acquired with reference to this map data.

In map DB 185T, in addition to the above-described map data, a virtual parking place model is constructed, which is a virtual model of the parking place, by using the vector data indicating the routes and the structure of arrangement of parking frames in the parking place and so forth. This virtual parking place model is a model in which an actual parking place where vehicle 5 is to be forwarded is reconstructed on a computer. This virtual parking place model is used for selection of a parking frame where forwarded vehicle 5 is to be parked, selection of a route to the parking frame, and so forth. Note that details of the virtual parking place model will be described in detail after the configuration of the actual parking place is described.

Note that the virtual parking place model of the present embodiment is a model targeted for parking place 110 (FIG. 7) dedicated for vehicle 5 allowed to automatically travel by remote control. On the other hand, as for a general parking place operated by mutual access together with general vehicles, by using, for example, an ultrasonic vehicle-presence sensor or the like provided on a ceiling of each parking frame, whether each parking frame is full or vacant is preferably managed on the control server device 18 side.

With CPU 181 executing a program read from ROM 182, control server device 18 of FIG. 6 achieves functions as the following respective configurations.

(3.1) Data communication part: The data communication part performs data communications with vehicle 5.

(3.2) Marker information acquiring part: When receiving tag information (tag ID) from the vehicle 5 side, the marker information acquiring part refers to marker DB 185M and acquires marker information regarding magnetic marker 10 corresponding to that tag ID.

(3.3) Vehicle spec information acquiring part: The vehicle spec information acquiring part refers to vehicle DB 185V by using the vehicle ID linked to the vehicle status information and acquires vehicle spec information.

(3.4) Vehicle position identifying part (position identifying part): The vehicle position identifying part identifies the vehicle position where vehicle 5 is located and the orientation (azimuth) of vehicle 5.

(3.5) Remote control part: The remote control part remotely controls vehicle 5 so that it can move along a predetermined route. By a calculation process with the vehicle status information including the vehicle speed and the steering angle of vehicle 5, tag ID, and so forth taken as input values, the remote control part calculates control values such as a target steering angle and a target vehicle speed and replies with them as control information. Note that the target speed is a control value including speed zero, that is, stop control.

(3.6) Parking frame selecting part: The parking frame selecting part selects a parking frame with reference to the virtual parking place model.

(3.7) Forwarding route selecting part: The forwarding route selecting part selects a forwarding route for moving vehicle 5 to the parking frame selected by the parking frame selecting part.

(4) Traveling Environment of Vehicle

In automatic parking system 1, as in FIG. 7, positions where vehicle 5 can move are managed, such as frames for vehicle 5 to stop and routes for vehicle 5 to be caused to travel.

As a frame for vehicle 5 to be stopped, there are check-in vehicle-stop frame 113 where a user stops vehicle 5 when using the valet parking service, checkout vehicle-stop frame 115 for returning vehicle 5 to its owner, parking frames 111 for vehicle to be parked, and so forth. Check-in vehicle-stop frame 113 and checkout vehicle-stop frame 115 are provided in traffic rotary 190 or the like of facility 19 such as a hotel which provides the valet parking service. Also, parking frames 111 are provided in an underground parking place of facility 19, a parking place adjacent to facility 19, a remote parking place away from facility 19, or the like.

Check-in vehicle-stop frame 113 and checkout vehicle-stop frame 115 are rectangular frames printed on road surface 100S for accommodating vehicle 5. Parking frame 111 is incomplete rectangular frame with an opening provided on one side. In road surface 100S of each frame, magnetic markers 10 are disposed so as to be detectable by vehicle 5 stopped. Magnetic markers 10 are arranged 2 m away from each other along the center line of the rectangular frame in a longitudinal direction.

As a route for vehicle 5 to move, there are route (movement route) 131 from facility 19 such as the hotel which provides the valet parking service to parking place 110, route (inside route) 135 for vehicle 5 to move inside parking place 110, route (movement route) 133 for returning from parking place 110 to facility 19, and so forth. On these routes 131, 133, and 135, magnetic markers 10 are laid along the center of a traveling lane forming a traveling area. Magnetic markers 10 are arranged at 2 m spacings along routes 131, 133, and 135. Note in the present embodiment that movement routes 131 and 133 between facility 19 and parking place 110 are configured to use a road with two lanes for two-way traffic, one lane for each way.

(4.1) Configuration of Parking Place

In parking place 110 exemplarily depicted in FIG. 7, a plurality of islands 11 with parking frames 111 arranged side by side are arranged in parallel, and inside route 135 for vehicle 5 to move inside the place is provided. As inside route 135, there are island routes 135A facing islands 11 and crossing routes 135B for movement from island 11 to island 11. Inside route 135 assumes a substantially ladder shape as a whole by a combination of island routes 135A and crossing routes 135B.

Inside the parking place, it is possible to move to target island 11 by using crossing route 135B and move to target parking frame 111 by using island route 135A. In parking place 110, an entrance and an exit are shared. Vehicle 5 entering from the entrance can move inside the parking place in a one-way manner to move to parking frame 111 scheduled for parking and then move to the exit in the one-way manner.

Furthermore, on island route 135A to which each parking frame 111 on island 11 opens, as in FIG. 8, magnetic markers 10 at 2 m spacing along the route direction and also guiding markers 101 for guiding vehicle 5 to garaging to parking frames 111 are laid. Guiding markers 101 are arranged at 50 cm spacings along substantially arc-shaped guiding line 137 defined for each parking frame 111. This guiding line 137 is a line matching a standard garaging path through which the position of the center (center position) of the rear-side magnetic sensor array 21B passes when a middle-size-class passenger vehicle (vehicle 5) is garaged. This guiding line 137 forms a substantially arc shape taking magnetic marker 10 laid at a location passing the front of the corresponding parking frame 111 as a starting point to reach magnetic marker 10 closest to the opening inside parking frame 111.

(4.2) Virtual Parking Place Model

As described above, in automatic parking system 1, by using the storage area of map DB 185T, the virtual parking place model is constructed as the virtual model of parking place 110. This virtual parking place model is a virtual model based on the map data using vector data indicating a route structure of inside routes 135 in parking place 110, the arrangement of parking frames 111, and so forth. In this virtual parking place model, a vehicle-presence flag (vehicle-presence information) indicating whether vehicle 5 is parked in each parking frame 111 (the presence or absence of a vehicle) is provided. Onto inside routes 135 of the virtual parking place model, vehicle 5 moving on inside route 135, vehicle 5 being garaged, and so forth can be mapped. The virtual parking place model with the vehicle positions of other vehicles 5 being mapped can be used, for example, to select a forwarding route allowing vehicle to be efficiently forwarded without interference with other vehicles 5.

Next, (A) marker detection process, (B) vehicle forwarding process, and (C) garaging process in automatic parking system 1 configured as described above are sequentially described.

(A) Marker Detection Process

The marker detection process is a process to be performed by magnetic sensor arrays 21A and 21B included in vehicle 5 (refer to FIG. 5). Magnetic sensor arrays 21A and 21B perform a marker detection process in a cycle of 3 kHz by using magnetic sensor Cn.

As described above, magnetic sensor Cn is configured to measure magnetic components in the forwarding direction and the vehicle-width direction of vehicle 5. For example, when this magnetic sensor Cn move in the forwarding direction to pass over magnetic marker 10 straight above, the magnetic measurement value in the forwarding direction has its sign reversed before and after magnetic marker 10 and changes as crossing zero at the position straight above magnetic marker 10 as in FIG. 9. Therefore, during traveling of vehicle 5, as for magnetism in the forwarding direction detected by any magnetic sensor Cn, when zero-cross Zc occurs where the sign of that measurement value of magnetism is reversed, it can be determined that magnetic sensor array 21A, 21B is positioned straight above magnetic marker 10. Detection processing circuit 212 determines to detect magnetic marker 10 when magnetic sensor array 21A, 21B is positioned straight above magnetic marker 10 and zero-cross Zc of the magnetic measurement value in the forwarding direction occurs.

Also, for example, when a movement along a virtual line in the vehicle-width direction passing over magnetic marker 10 straight above is assumed for a magnetic sensor with the same specifications as those of magnetic sensor Cn, the magnetic measurement value in the vehicle-width direction has its sign reversed on both sides across magnetic marker 10 and changes so as to cross zero at the position straight above magnetic marker 10. In the case of magnetic sensor arrays 21A and 21B each with fifteen magnetic sensors Cn arrayed in the vehicle-width direction, the sign of the magnetic measurement value in the vehicle-width direction of the magnetism detected by magnetic sensors Cn differs depending on which side the sensor is present via magnetic marker (FIG. 10).

Based on a distribution of FIG. 10 exemplarily depicting the magnetic measurement value in the vehicle-width direction of each magnetic sensor Cn belonging to magnetic sensor arrays 21A and 21B, an intermediate position of adjacent two magnetic sensors Cn across zero-cross Zc with the sign of the magnetic measurement value in the vehicle-width direction being reversed or a position straight below magnetic sensor Cn with magnetism in the vehicle-width direction to be detected being zero and with the signs of the magnetic measurement values of magnetic sensors Cn on both outsides being reversed is the position of magnetic marker 10 in the vehicle-width direction. As for the center position (for example, the position of magnetic sensor C8) of magnetic sensor arrays 21A, 21B, detection processing circuit 212 measures a positional deviation in the vehicle-width direction with respect to magnetic marker 10 as the above-described lateral shift amount. For example, in the case of FIG. 10, the position of zero-cross Zc is a position corresponding to C9.5 at a nearly midpoint between C9 and C10. As described above, since the space between magnetic sensors C9 and C10 is 10 cm, the lateral shift amount with respect to magnetic marker 10 is (9.5−8)×10 cm, with respect to C8 positioned at the center of magnetic array 21A, 21B in the vehicle-width direction.

(B) Vehicle Forwarding Process

Details of the vehicle forwarding process of forwarding vehicle 5 between facility 19 and parking place 110 are described with reference to a flow diagram of FIG. 11. Note in the drawing that processes on the control server device 18 side and processes on the vehicle 5 side are depicted in parallel. For a user driving vehicle 5 to facility 19 such as a hotel to use the valet parking service, it is first required to stop vehicle 5 in the above-described check-in vehicle-stop frame 113 provided to traffic rotary 190 of facility 19. For example, the vehicle forwarding process starts when column 550 of "valet parking service" in drive assist menu screen 55 (FIG. 12) displayed on a vehicle onboard display (omitted in the drawing) is selected to make a request for using the service.

When the user, who is the driver of vehicle 5, selects column 550 of "valet parking service", a use request to an automatic parking system 1 side is made. Also on the vehicle 5 side, switching is performed from a manual mode in which the driver drives himself or herself to a forwarding mode in which vehicle 5 is forwarded to parking place 110 by automatic traveling (S201).

When the request for using the valet parking service is made on the vehicle 5 side and switching to the forwarding mode is performed (S201), control server device 18 first refers to the above-described virtual parking place model. Control server device 18 inquires about (refers to) the vehicle-presence flag corresponding to each parking frame 111 in the virtual parking place model and selects any vacant parking frame 111 (S101).

Furthermore, control server device 18 selects a forwarding route for moving vehicle 5 to the selected parking frame 111 (S101). The forwarding route is a route by a combination of route (movement route) 131 from check-in vehicle-stop frame 113 to the entrance of parking place 110 of the selected parking frame 111 and route (inside route) 135 from the entrance of parking place 110 to parking frame 111. The forwarding route is defined also on the map data stored in the above-described map DB 185T. On the forwarding route to parking place 110, the laying position of magnetic marker 10 on the foremost side in check-in vehicle-stop frame 113 serves as a starting point. Also, for parking frame 111 selected above, the laying position of magnetic marker 10 as the starting point of guiding line 137 assumed as described above serves as an end point of the forwarding route.

With reference to the forwarding route defined on the map data, it is possible to grasp a shape of the forwarding route and grasp a curve ahead, a merging point, and so forth. The laying positions of magnetic markers 10 laid in the route are associated with the map data. Therefore, when any magnetic marker 10 is detected on the vehicle 5 side, the vehicle position on the forwarding route can be identified by identifying that magnetic marker 10.

On the vehicle 5 side, detection of magnetic marker 10 is performed by control by control unit 32. As described above, on road surface 100S of check-in vehicle-stop frame 113, magnetic markers 10 are arranged at 2 m spacings so as to correspond to front and rear magnetic sensor arrays 21A and 21B attached to vehicle 5 (refer to FIG. 7).

In response to switching to the forwarding mode (S201), control unit 32 of vehicle 5 controls front and rear magnetic sensor arrays 21A and 21B to detect magnetic marker 10 (S202) and also measures a lateral shift amount of the center position of magnetic sensor array 21 with respect to magnetic marker 10 (S203). This lateral shift amount can be handled as a lateral shift amount of vehicle 5 with respect to magnetic marker 10. Lateral shift amounts with respect to two magnetic markers 10 spaced apart to the front and the rear are useful for identifying the orientation (azimuth) of vehicle 5 with respect to the azimuth connecting these two magnetic markers 10 as a reference.

Note that to perform the above-described steps S202 and S203, vehicle 5 may be moved inside check-in vehicle-stop frame 113 so as to be able to detect magnetic marker 10. For example, at a time of parking in check-in vehicle-stop frame 113, if front-side magnetic sensor array 21A has not yet passed over front-side magnetic marker 10 in check-in vehicle-stop frame 113, it is preferable to cause vehicle 5 to move forward to a position allowing detection. Alternatively, at the time of parking in check-in vehicle-stop frame 113, if front-side magnetic sensor array 21A has passed over front-side magnetic marker 10 in check-in vehicle-stop frame 113, it is preferable to cause vehicle 5 to move backward to the position allowing detection.

Next, control unit 32 of vehicle 5 controls tag reader unit 34 to perform reading of the tag ID (tag information) of RFID tag 15 provided to front-side magnetic marker 10 (S204). Then, it transmits vehicle status information including the tag ID, the lateral shift amount of vehicle 5 with respect to magnetic marker 10, and so forth to control server device 18 (S205). Note that since the vehicle ID is linked to the vehicle status information as described above, vehicle 5 as a transmission source can be identified on the control server device 18 side.

Note in the following description that, as for description of operation of control unit 32 such as, for example, control unit "controls magnetic sensor arrays 21A and 21B to detect magnetic marker 10" as described, description is made by taking control unit 32 as a subject such as "control unit 32 detects magnetic marker 10. The same goes for control by tag reader unit 34.

When receiving vehicle status information, control server device 18 first refers to marker DB 185M and vehicle DB 185V described above. Control server device 18 refers to marker DB 185M by using the tag ID included in the vehicle status information to acquire marker information of the corresponding front-side magnetic marker 10 and identify its laying position. Then, it calculates a position offset from the laying position by the lateral shift amount with respect to front-side magnetic marker 10, and identifies the position as a vehicle position (S102). Furthermore, based on two lateral shift amounts with respect to two front and rear magnetic markers 10, control server device 18 calculates and identifies the orientation (azimuth) of vehicle 5 with respect to a line connecting two magnetic markers 10 (S102).

Furthermore, control server device 18 refers to vehicle DB 185V by using the vehicle ID linked to the vehicle status information to acquire vehicle spec information. As described above, in this vehicle spec information, specification information of vehicle 5 required for remote control is included, such as vehicle body dimensions, a wheelbase, front and rear overhangs, a minimum radius of turn, and a steering angle gain. In particular, vehicle body dimensions, front and rear overhangs, steering angle gain, and so forth are important control parameters for a garaging process, which will be described further below.

In this manner, control server device 18 identifies the position (vehicle position) and orientation of vehicle 5 as the control target and, after acquiring control parameters on the vehicle 5 side useful for control, starts remote control for achieving automatic traveling of vehicle 5 (S103). Based on the position and orientation and so forth of vehicle 5 as the control target, control server device 18 first calculates control values such as a target speed and a target steering angle for causing vehicle to automatically travel along the forwarding route selected at the above-described step S101 (S104). Then, control server device 18 transmits control information including those control values to vehicle 5 (S105).

Control unit 32 of vehicle 5 inputs the control values included in the control information received from control server device 18 to vehicle ECU 61. Vehicle ECU 61 having received the inputs of the control values controls the steering unit, the engine throttle, the brake actuator, and so forth not depicted and included in vehicle 5, thereby starting automatic traveling of vehicle 5 (S206).

Control unit 32 of vehicle 5 repeatedly tries to detect magnetic marker 10 during automatic traveling of vehicle 5 by remote control (S207: NO). When detecting magnetic marker 10 (S207: YES), it measures the lateral shift amount of vehicle 5 with respect to magnetic marker 10 (S208) and performs reading of the tag ID of RFID tag 15 provided to magnetic marker 10 (S209).

Here, on a route where vehicle 5 is caused to automatically travel, magnetic markers 10 are arranged at 2 m spacings. This 2 m spacing matches a space between magnetic sensor arrays 21A and 21B in vehicle 5. Therefore, two magnetic sensor arrays 21A and 21B arranged at the front and rear of vehicle 5 can simultaneously detect adjacent two magnetic markers 10.

In response to the detection of magnetic markers 10, control unit 32 of vehicle 5 transmits vehicle status information including two lateral shift amounts measured with respect to respective two magnetic markers 10, the tag ID, and so forth as well as the vehicle speed, the steering angle, and so forth to control server device 18 (S210). Control unit 32 of vehicle 5 repeatedly performs processes from vehicle control (S206) to transmission of vehicle status information (S210) until movement to the end point of the forwarding route, which is a switching point to a garaging mode, is completed.

Upon receiving the vehicle status information (S106: YES), as with the above-described step S102, control server device 18 obtains a current vehicle position and orientation by calculation (S107). Then, it calculates control values such as a target speed and a target steering angle until detecting the next magnetic marker 10 (S108) so as to allow traveling along the forwarding route, and transmits control information toward vehicle 5 (S109). In vehicle 5 having received transmission of the control information as described above, vehicle control is performed based on this control information, and automatic traveling is continued (S206).

Then, every time magnetic marker 10 is detected, processes at the above-described steps S208 to S210 are repeatedly performed. On the other hand, on the control server device 18 side, every time vehicle status information transmitted by vehicle 5 for every detection of magnetic marker 10 is received, the above-described calculation of the vehicle position and orientation at step S107, calculation of control values at step S108, and transmission of control information at step S109 are performed.

As described above, a series of processes in which vehicle 5 transmits vehicle status information in response to the detection of magnetic marker 10 and, in response to this, control server device 18 transmits control information is repeatedly performed until vehicle 5 arrives at the endpoint of the forwarding route selected at the above-described step S101 (S110: NO). Note that, as described above, as the endpoint of the forwarding route, the laying position of magnetic marker 10 corresponding to the starting point of guiding line 137 (refer to FIG. 8) corresponding to parking frame 111 selected at the above-described step S101 is set.

If the tag ID included in the vehicle status information is identification information of RFID tag 15 provided to magnetic marker 10 positioned at the end point of the forwarding route, control server device 18 determines that vehicle 5 has arrived at the end point of the forwarding route (S110: YES) and transmits a movement complete signal toward vehicle 5 (S111). Then, control server device 18 makes a transition to garaging process P1, which will be described further below, of causing vehicle 5 to move backward to be accommodated in parking frame 111. Then, the process by control server device 18 ends with completion of parking (S112: YES). On the other hand, on the vehicle 5 side, upon reception of the movement complete signal from control server device 18, it is determined as movement completed (S211: YES), and a transition is made to garaging process P1 by backward movement. Then, with completion of parking, the process on the vehicle 5 side also ends (S212: YES).

(C) Garaging Process

Garaging process P1 is started (S231), as in a flow diagram of FIG. 13, when the control mode on the vehicle 5 side is switched from the above-described forwarding mode to the garaging mode. When the control mode on the vehicle 5 side is switched to the garaging mode, control server device 18 calculates the vehicle position and the orientation based on the lateral shift amount and the tag ID included in the vehicle status information corresponding to magnetic marker 10 positioned at the end point of the forwarding route (S131). As described above, the vehicle position is a position acquired by shifting the laying position of magnetic marker 10 corresponding to the tag ID by the lateral shift amount. Similarly, as described above, the orientation can be identified by lateral shift amounts with respect to two magnetic markers 10.

Next, control server device 18 calculates control values for garaging by backward movement. Here, control server device 18 refers to vehicle DB 185V by using the vehicle ID to grasp specifications such as vehicle body dimensions and front and rear overhangs of vehicle 5 as the control target. Then, as in FIG. 14, it calculates garaging paths 139 through which vehicle 5 passes for garaging that vehicle 5 into parking frame 111 (S132). As garaging paths 139, garaging path 139F, which is a path through which the center position of front-side magnetic sensor array 21A passes, and garaging path 139R, which is a path through which the center position of rear-side magnetic sensor array 21B passes, are obtained by calculation.

Note that garaging paths 139 as control targets calculated at step S132 and guiding line 137 of guiding markers 101 corresponding to the standard garaging path do not necessarily match each other. Garaging paths 139 as control targets differ depending on the difference in specification of vehicle 5 for each vehicle type, such as the vehicle body dimensions and front and rear overhangs of vehicle 5 as the control target. Also, garaging path 139F of the center position of front-side magnetic sensor array 21A and garaging path 139R of the center position of rear-side magnetic sensor array 21B are not the same path due to an inner wheel difference that can occur when vehicle 5 moves along an arc route.

In control server device 18, as described above, the virtual parking place model is stored. This virtual parking place model is configured to include map data of inside route 135 and parking frames 111 in parking place 110. Garaging paths 139 calculated at the above-described step S132 as control targets are managed as being mapped on the map data of the virtual parking place model. In this virtual parking place model, the standard garaging path for each parking frame 111 is identified as guiding line 137 of corresponding guiding markers 101. Thus, control server device 18 calculates garaging paths 139 as control targets, and then calculates, for each position of guiding markers 101, a line deviation (refer to FIG. 15), which is a deviation of garaging paths 139 as control targets with respect to guiding line 137 indicating the standard garaging path (S133).

Control server device 18 calculates control values (target steering angle and target speed) for causing vehicle 5 to move backward along garaging paths 139 as control targets calculated at the above-described step S132 (S134), and transmits control information including those control values to the vehicle 5 side (S135). On the vehicle 5 side, vehicle control (backward movement) is started in response to the reception of the control information from control server device 18 (S232).

Control unit 32 of vehicle 5 repeatedly tries to detect guiding marker 101 at a time of garaging (backward movement) by remote control (S233: NO). When guiding marker 101 is detected (S233: YES), control unit 32 measures a lateral shift amount of vehicle 5 with respect to guiding marker 101 (S234). Note that guiding markers 101 are arranged at 50 cm spacings, as described above. Therefore, two guiding markers 101 can be detected simultaneously by two magnetic sensor arrays 21A and 21B disposed at 2 m spacing, and lateral shift amounts with respect to two guiding markers 101 can be each measured. Note that magnetic polarity of guiding markers 101 is different from magnetic polarity of other magnetic markers 10 laid in the routes and frames. Therefore, on the vehicle 5 side, it is possible to distinguish between guiding marker 101 and magnetic marker 10. At a time of detection of guiding marker 101, a process of reading tag information is not performed.

When detecting guiding marker 101, control unit 32 of vehicle 5 transmits, to control server device 18, vehicle status information including the lateral shift amount with respect to guiding marker 101, a steering angle, a backward movement speed, and so forth (S235). Control server device 18 having received this vehicle status information (S136: YES) counts the number of passings of guiding markers 101 or the like after switching to the garaging mode, thereby identifying two detected guiding markers 101.

Control server device 18 calculates a differential value between the line deviation (refer to FIG. 15) for each guiding marker 101 calculated at the above-described step S133 and the lateral shift amount (refer to FIG. 15) of the center position of magnetic sensor array 21A, 21B with respect to the each guiding marker 101 (S137). And, control server device 18 calculates control values (target steering angle and target speed) for the differential value (differential value between the line deviation and the lateral shift amount) calculated at the above-described step S137 to be made closer to zero (S138), and transmits control information including the control values to the vehicle 5 side (S139).

Control unit 32 of vehicle 5 having received this control information inputs the control values to vehicle ECU 61 for performing vehicle control (S232). Then, every time guiding marker 101 is detected during backward movement by garaging (S233: YES), measurement of the lateral shift amount (S234) and the transmission of vehicle status information (S235) are repeatedly performed. Also in control server device 18, every time vehicle status information is received (S136: YES), processes such as calculation of the differential value between the line deviation and the lateral shift amount (S137) and calculation of control values (S138) are repeated. This repetition of these processes continues until magnetic marker 10 in parking frame 111 is detected on the vehicle side (S236: NO).

When magnetic marker 10 arranged in parking frame 111 is detected on the vehicle 5 side (S236: YES), vehicle status information including information such as the tag ID and the lateral shift amount is transmitted to control server device 18 (S237). On the other hand, when receiving this vehicle status information, control server device 18 determines that magnetic marker 10 in parking frame 111 has been detected by vehicle 5 (S140: YES). Then, a garaging complete signal is transmitted to the vehicle 5 side (S141) and the garaging process ends. On the other hand, on the vehicle 5 side, reception of the garaging complete signal from control server device 18 is waited (S238: NO) and, in response to reception, the garaging process ends (S238: YES).

So far, description has been made to an operation of automatic parking system 1 when forwarding vehicle 5 from facility 19 to parking place 110 for automatic garaging by (B) vehicle forwarding process and (C) garaging process. An operation of automatic parking system 1 when forwarding vehicle 5 from parking place 110 to facility 19 is similar to that at the time of forwarding to parking place 110, and detailed description is therefore omitted. An operation flow is as follows: vehicle 5 is caused to get out from parking frame 111 along guiding line 137 and is then moved along the forwarding route (inside route 135 and movement route 133) to be moved by automatic traveling toward facility 19 and is then stopped in checkout vehicle-stop frame 115 of traffic rotary 190. In traffic rotary 190, it is preferable to stop vehicle 5 in response to detection of foremost-side magnetic marker 10 in checkout vehicle-stop frame 115.

As described above, automatic parking system 1 of the present embodiment is a system capable of identifying, with high accuracy, the vehicle position and the orientation (azimuth) of vehicle 5 by using magnetic markers 10 laid in the routes and frames and forwarding vehicle 5 with high reliability. Unlike a GPS (Global Positioning System), this automatic parking system 1 is stably operable even in indoor environments or environments such as a place between buildings. Also, unlike a system of acquiring an image taken by an environment recognition camera and performing recognition process to identify the vehicle position and orientation inside the parking place, the present system does not receive influences of external environments such as rain, night, and fog. By using magnetic markers 10 with their laying positions known, it is possible to identify the vehicle position with extremely high accuracy.

According to automatic parking system 1, burdens can be reduced on both of the facility operation side such as a hotel or a shopping center and the facility user side. For example, for users arriving at the facility such as the hotel or the shopping center with automobiles (vehicles), efforts for finding a parking place, driving burdens for garaging, burdens of returning from the parking place to the entrance of the facility on foot, and so forth can be decreased. For the facility operation side, it is possible to provide the parking place away from the facility or the like. For example, while hotels, shopping centers, and others are suitably built at bustling places or places with convenience for transportation and they are often built at places at relatively high land price, if the necessity of providing the parking place nearby can be reduced, cost for getting hold of the parking place can be decreased. Also, since a dedicated parking place supporting automatic parking system 1 neither requires for drivers and others to get on and off nor requires door opening and closing, vehicles can be parked with narrow spacings. If a spacing between parked vehicles is narrowed, the number of vehicles to be parked per unit area can be increased, and an improvement in efficiency in space can decrease cost of the parking place. Furthermore, if vehicles are parked in a state in which the doors cannot be opened or closed, an entry into the vehicle by a suspicious person can be prevented, and a possibility or occurrence of crimes such as vehicle theft and stealing of valuables from vehicles can be suppressed.

In the configuration of the present embodiment, the tag ID of RFID tag 15 provided to magnetic marker 10 is used to facilitate identification of magnetic marker 10 detected by vehicle 5. The configuration in which the laying positions of magnetic markers 10 are mapped on the map data indicating the structure of the routes including the routes in the parking place may be combined with a configuration of counting, for example, the number of passings over magnetic markers 10 after the vehicle departs from the starting point. When the vehicle detects magnetic marker 10, if the number of passings over magnetic markers 10 is known, it is possible to uniquely identify which magnetic marker among magnetic markers 10 mapped on the map data has been detected.

In the present embodiment, with RFID tag 15 attached to the end face of the columnar magnetic marker 10, both are integrally configured. With magnetic marker 10 and RFID tag 15 integrally configured, a positional shift between both can be suppressed before it happens. This allows communications with RFID tag 15 with high reliability when vehicle 5 detects magnetic marker 10. Furthermore, when approaching magnetic marker 10, vehicle 5 becomes in a state of being capable of communicating with RFID tag 15 irrespective of its entering direction, at similar timing.

As for magnetic marker 10 with RFID tag 15 of the present embodiment, RFID tag 15 and magnetic marker 10 can be integrally handled at a time of setup, and construction work can be efficiently performed. Furthermore, at a time of laying, it is not required to consider a rotating position of the columnar magnetic marker 10 centering at an axis in the longitudinal direction, and setup is easy and efficient. Note that the integrated configuration of RFID tag 15 and magnetic marker 10 is not a necessary configuration and they may be separate bodies.

In the present embodiment, RFID tag 15 is exemplarily described as one example of the position information providing part. As the position information providing part, another configuration may be adopted, such as printing of a barcode or code pattern or a combination of magnetic polarities of magnetic markers.

In place of vehicle 5 (FIG. 4) exemplarily depicted in the present embodiment, a vehicle including an inertial navigation unit (IMU: Inertial Measurement Unit) may be assumed. According to the IMU including an electronic compass, an acceleration sensor, a gyro sensor, or the like, it is possible to acquire measurement values required for estimation of a relative position of the vehicle. If the relative position after passing over a magnetic marker can be estimated, by adding the relative position to the vehicle position identified based on the laying position of the magnetic marker, it is possible to estimate the vehicle position at an intermediate position until the next magnetic marker is detected. In this case, an arrangement space between magnetic markers can be widened.

In a configuration of the present embodiment, the magnetic markers with the RFID tags are arranged on the route. In place of this, the magnetic markers with the RFID tags may be arranged at specific locations such as a forwarding starting point or a merging or branching point on the route and magnetic markers without RFID tags may be arranged at intermediate locations. When the magnetic marker provided with the RFID tag is detected, the laying position of that magnetic marker can be acquired by using the tag ID. After passing over magnetic marker 10 with the RFID tag, by taking the laying position of this magnetic marker 10 as a reference position, the relative position based on, for example, the measurement values by the IMU described above, is preferably added to identify the vehicle position in an estimating manner. When a magnetic marker without an RFID tag is newly detected, with reference to marker DB 185 M, a search is preferably made for a laying position closest to the estimated vehicle position, thereby identifying the detected magnetic marker. If the detected magnetic marker can be identified, as with the case in which the tag ID can be acquired, the vehicle position can be identified with high accuracy based on the laying position of the magnetic marker.

Furthermore, in place of or in addition to the above-described IMU, it is also preferable to adopt a unit which detects the orientation of the vehicle by using a rotation speed or a rotation amount for each of four wheels of the vehicle, the steering angle of a steering wheel or wheels to be steered, and so forth. The rotation speed and the rotation amount of each wheel and so forth can be measured by a relatively simple configuration acquired by attaching a rotation sensor or the like to each wheel. In this manner, by adopting the unit which detects the orientation of the vehicle by using the steering angle or the rotation speed or the like for each wheel, the relative position of the vehicle can be estimated while an increase in cost on the vehicle side is suppressed.

Also in the present embodiment, the orientation (azimuth) of the vehicle is identified by using the configuration capable of simultaneously detecting different magnetic markers 10 by magnetic sensor arrays 21A and 21B arranged at two front and rear locations in vehicle 5. Adoption of this configuration allows the orientation of the vehicle to be identified with high reliability without reception of influences such as changes in the steering angle on the vehicle 5 side and so forth. In place of this, the orientation of the vehicle may be identified by a change in the lateral shift amounts when two or more magnetic sensor arrays at different positions in the longitudinal direction of the vehicle detect the same magnetic marker 10 in accordance with the movement of the vehicle. In this configuration, since no restrictions are imposed on the laying mode of magnetic markers 10, this is advantageous in view of cost of laying magnetic markers 10. Alternatively, while one magnetic sensor array may be provided on the vehicle side, and laying locations where two or more magnetic markers 10 are arranged at narrow spacings may be provided on the route. As this narrow spacing, for example, a space on the order of 1 m to 4 m equal to or shorter than the full length of the vehicle can be set. In this case, the orientation of the vehicle can be identified by a change in the lateral shift amounts with respect to each magnetic marker at a time of passing over two or more magnetic markers arranged at the laying locations. In this configuration, since only one magnetic sensor array of the vehicle is required, cost on the vehicle side can be suppressed. The two or more magnetic markers at the laying locations are preferably arranged along the route. When they are arranged along the route direction, the orientation of the vehicle with respect to a line connecting two or more magnetic markers at the laying locations is directly the orientation of the vehicle with respect to the route direction. Alternatively, at the laying locations, two or more magnetic markers may be arranged along a predetermined direction, such as a direction that is oblique to or crosses the route direction. Even this arrangement can be used to identify the orientation of the vehicle. Furthermore, when three or more magnetic markers are arranged at laying locations, the respective magnetic markers may be arranged linearly, but linear arrangement is not imperative. For example, in a case of three magnetic markers, each magnetic marker may be arranged at a position corresponding to each apex forming a triangle.

It is effective to ensure safety at a time of vehicle movement by using a vehicle onboard sensor, such as a distance measurement radar, camera, or ultrasonic obstruction sensor.

While a drive-in parking place in which vehicles move to parking frames is exemplarily described in the present embodiment, a multistory parking place may be used. In a case of a tower-type multistory parking place, it is only required at a time of garaging to stop the vehicle at a predetermined vehicle-stop position such as, for example, a movable palette. The movable palette with the vehicle mounted thereon moves, thereby completing vehicle parking operation (garaging).

Note that when parking frame 111 is selected (step S101 in FIG. 11), if another vehicle 5 being forwarded by remote control is present, parking frame 111 with less possibility of interference with garaging operation of that other vehicle 5 is preferably selected among vacant parking frames 111. Furthermore, indexing of a possibility of interference as a degree of interference is also preferable. A degree of interference Iv can be calculated for each parking frame by, for example, the following arithmetic equation. To select the parking frame, a parking frame with the lowest degree of interference Iv is selected.

$$Iv = \sum_{n=1}^{m}\left(\frac{1}{|Ta - Tn|} \times \alpha n\right) \qquad \text{[Equation 1]}$$

Here, Ta=Tp+t

The variables are as follows.

Ta: predicted time when the vehicle as the control target arrives at the parking frame as the calculation target Tp: current time (start time of vehicle forwarding process for the vehicle as the control target)

t: time required from the time of departing the facility to the time of arriving at the parking frame as the calculation target Tn: predicted time when an other vehicle n under remote control arrives at the parking frame αn: interference factor in accordance with a position relation between a parking frame where the other vehicle n is scheduled to be parked and the parking frame as the calculation target m: the number of other vehicles under remote control n: natural number.

Note that the interference factor an in the equation has a value corresponding to a positional relation between the parking frame as the calculation target and the parking frame where the other vehicle n is scheduled to be parked. The value of the interference factor an differs depending on whether the parking frame as the calculation target and the parking frame where the other vehicle n is scheduled to be parked face the same island route 135A and, if they face the same island route 135A, whether the parking frame as the calculation target is positioned on a front side or a back side. For example, if the parking frame as the calculation target and the parking frame where the other vehicle n is scheduled to be parked face the same island route 135A, it is preferably set that αn=1 if the parking frame as the calculation target is on the back side with respect to the parking frame where the other vehicle is scheduled to be parked and that αn=0.5 if the parking frame as the calculation target is on the front side with respect to the parking frame where the other vehicle is scheduled to be parked. Also, for example, if the parking frame as the calculation target and the parking frame where the other vehicle n is scheduled to be parked face different island routes 135A, αn=0.1 is preferably set.

While the configuration is exemplarily described in the present embodiment in which marker DB 185M in which the laying positions of magnetic markers 10 are managed as having the tag IDs of RFID tags 15 linked thereto is provided on the control server device 18 side, a configuration may be adopted in which each vehicle 5 includes the marker DB. In the configuration in which each vehicle 5 includes the marker DB, each vehicle 5 can identify the vehicle position without depending on the information from control server device 18. In addition, if each vehicle 5 includes a function for automatic traveling, autonomous traveling can be made without depending on the control from control server device 18. Even in the configuration in which each vehicle 5 is capable of autonomous traveling as described above, it is preferable to configure that each vehicle 5 transmits the vehicle position to control server device 18. In this case, management of the vehicle position of each vehicle 5 can be made on the control server device 18 side. Note that even if the vehicle performs autonomous traveling, it is preferable to inquire of the control server device about selection of the parking frame and the forwarding route.

For example, an image-taking camera which takes a downward view of check-in vehicle-stop frame 113 is also preferably installed on a wall surface of a building of facility 19 or the like. Based on an image taken by the image-taking camera with its position and downward-viewing angle fixed, it is possible to identify, with high accuracy, the vehicle position and orientation of the vehicle stopping in check-in vehicle-stop frame 113.

While the configuration is exemplarily described in the present embodiment in which the sheet-shaped RFID tag 15 is attached to the upper surface of magnetic marker 10, the configuration with magnetic marker 10 and RFID tag 15 integrated together is not imperative. It is required that magnetic marker 10 and RFID tag 15 be arranged at the same position, and RFID tag 15 may be arranged above or below magnetic marker 10 in a vertical direction.

In the foregoing, specific examples of the present invention are described in detail as in the embodiment, these specific examples merely disclose examples of technology included in the scope of the claims. Needless to say, the scope of the claims should not be restrictively construed based on the configuration, numerical values, and so forth of the specific examples. The scope of the claims includes techniques acquired by variously modifying, changing, or combining as appropriate the above-described specific examples by using known techniques, knowledge of a person skilled in the art, and so forth.

REFERENCE SIGNS LIST 1 automatic parking system
10 magnetic marker
101 guiding marker
110 parking place
111 parking frame
113 check-in vehicle-stop frame
115 checkout vehicle-stop frame
131, 133 movement route
135 inside route
135A island route
135B crossing route
137 guiding line
139 garaging path
15 RFID tag (wireless tag, position information providing part)
18 control server device (position identifying part, parking frame selecting part)
185 storage device (storage medium)
185M marker database (marker DB)
185V vehicle database (vehicle DB)
185T map database (map DB)
21 magnetic sensor array (magnetic detecting part)
212 detection processing circuit
32 control unit
34 tag reader unit
5 vehicle
61 vehicle ECU

The invention claimed is:

1. An automatic parking system which controls a vehicle so as to cause the vehicle to be moved to a parking place and to be accommodated in a parking frame provided in the parking place, the system comprising:
  a route where a magnetic marker forming a magnetism generation source is laid so as to be detectable by using a magnetic detecting part provided to the vehicle;
  a position information providing part which provides position identification information capable of identifying a laying position of the magnetic marker; and
  a position identifying part which identifies a vehicle position where the vehicle is located based on the laying position of the magnetic marker,
  wherein
    a garaging path for each parking frame is identified as a guiding line,
  the system further comprises
    a storage medium which stores a vehicle spec information including a specification information of the vehicle; and
    a configuration which calculates a garaging path as a control target by using the specification information of the vehicle in the vehicle spec information and calculates a line deviation which is a deviation of the garaging path as the control target with respect to the guiding line, and,
  the specification information of the vehicle in the vehicle spec information includes a steering angle gain which is a ratio of a steering angle with respect to a steering-wheel operation angle and vehicle body dimensions of the vehicle.

2. The automatic parking system according to claim 1, wherein the specification information of the vehicle in the vehicle spec information further includes front and rear overhangs of the vehicle.

3. The automatic parking system according to claim 1, wherein the position information providing part is a wireless tag provided correspondingly to the magnetic marker so as to provide the position identification information to the vehicle side via wireless communications.

4. The automatic parking system according to claim 3, wherein the wireless tag and the magnetic marker are integrally configured.

5. The automatic parking system according to claim 1, wherein
the storage medium further stores a virtual parking place model which is a virtual model of the parking place and has incorporated existing vehicle information indicating a presence or an absence of the vehicle in the parking frame, and
the virtual parking place model is the virtual model for mapping the vehicle moving on an inside route and the vehicle being garaged.

6. The automatic parking system according to claim 5, further comprising a parking frame selecting part which selects the parking frame where the vehicle is to be accommodated with reference to the existing vehicle information of the parking frame incorporated in the virtual parking place model, wherein
the virtual parking place model is used to select a forwarding route allowing the vehicle to be forwarded without interference with an other vehicle.

7. The automatic parking system according to claim 5, further comprising a map data indicating a structure of routes where the vehicle is caused to automatically travel by remote control and a structure of an arrangement of the parking frame in the parking place, wherein
the virtual parking place model is constructed in a storage area of the storage medium in addition to the map data.

8. The automatic parking system according to claim 5, wherein the garaging path for each parking frame is identified as the guiding line in the virtual parking place model.

9. The automatic parking system according to claim 1, wherein
guiding markers are laid as other magnetic markers along the guiding line, and
the configuration which calculates the deviation of the garaging path calculates the deviation of the garaging path for each position of the guiding markers.

10. The automatic parking system according to claim 9, wherein a magnetic polarity of guiding markers is different from a magnetic polarity of the magnetic markers laid in the route so that the vehicle side is able to distinguish the guiding markers.

11. The automatic parking system according to claim 1, further comprising
a configuration which calculates a degree of interference indicating a possibility of interference with an other vehicle under control.

12. The automatic parking system according to claim 11, further comprising
a configuration which selects the parking frame with a lowest degree of the degree of interference when selecting the parking frame.

13. The automatic parking system according to claim 1, further comprising
a configuration which controls the vehicle so that a differential value between the deviation of the vehicle to the guiding line and the line deviation is made closer to zero.

14. The automatic parking system according to claim 1, wherein
the magnetic detecting part is capable of measuring a lateral shift amount with respect to each of the guiding markers, and
the automatic parking system further comprises a configuration which controls the vehicle so that a differential value between the lateral shift amount and the line deviation is made closer to zero.

15. An automatic parking system which controls a vehicle so as to cause the vehicle to be moved to a parking place and to be accommodated in a parking frame provided in the parking place, the system comprising:
a route where a magnetic marker forming a magnetism generation source is laid so as to be detectable by using a magnetic detecting part provided to the vehicle;
a position information providing part which provides position identification information capable of identifying a laying position of the magnetic marker; and
a position identifying part which identifies a vehicle position where the vehicle is located based on the laying position of the magnetic marker,
wherein
a garaging path for each parking frame is identified as a guiding line, the system further comprises
a storage medium which stores a vehicle spec information including a specification information of the vehicle; and
a configuration which calculates a garaging path as a control target by using the specification information of the vehicle in the vehicle spec information and calculates a line deviation which is a deviation of the garaging path as the control target with respect to the guiding line,
guiding markers are laid as other magnetic markers along the guiding line, and the configuration which calculates the deviation of the garaging path calculates the deviation of the garaging path for each position of the guiding markers,
the magnetic detecting part is provided at each of two front and rear locations in a longitudinal direction of the vehicle so that different guiding markers can be detected simultaneously, and
the automatic parking system further comprises a configuration which controls the vehicle so that a differential value between a lateral shift amount detected by a front magnetic detecting part and the line deviation and a differential value between a lateral shift amount detected by a rear magnetic detecting part and the line deviation are made closer to zero.

16. An automatic parking system which controls a vehicle so as to cause the vehicle to be moved to a parking place and to be accommodated in a parking frame provided in the parking place, the system comprising:
a route where a magnetic marker forming a magnetism generation source is laid so as to be detectable by using a magnetic detecting part provided to the vehicle;
a position information providing part which provides position identification information capable of identifying a laying position of the magnetic marker;

a position identifying part which identifies a vehicle position where the vehicle is located based on the laying position of the magnetic marker; and a storage medium which stores a virtual parking place model which is a virtual model of the parking place and has incorporated existing vehicle information indicating a presence or an absence of the vehicle in the parking frame, wherein the virtual parking place model is the virtual model for mapping the vehicle moving on an inside route and the vehicle being garaged, the system further comprises a parking frame selecting part which selects the parking frame where the vehicle is to be accommodated with reference to the existing vehicle information of the parking frame incorporated in the virtual parking place model, the virtual parking place model is used to select a forwarding route allowing the vehicle to be forwarded without interference with an other vehicle, the system further comprises a configuration which selects the parking frame with a lowest degree of the degree of interference when selecting the parking frame, the degree of interference is an index calculated by using an arithmetic equation including a time difference between a time when the vehicle as a control target arrives at the parking frame and a time when the other vehicle arrives at another parking frame, and an interference factor in accordance with a position relation between the parking frame where the vehicle as the control target is scheduled to be parked and the other parking frame where the other vehicle is scheduled to be parked.

17. An automatic parking system which controls a vehicle so as to cause the vehicle to be moved to a parking place and to be accommodated in a parking frame provided in the parking place, the system comprising:

a route where a magnetic marker forming a magnetism generation source is laid so as to be detectable by using a magnetic detecting part provided to the vehicle;

a position information providing part which provides position identification information capable of identifying a laying position of the magnetic marker; and a position identifying part which identifies a vehicle position where the vehicle is located based on the laying position of the magnetic marker, wherein the position identifying part identifies an orientation of the vehicle, the magnetic detecting part is capable of detecting the magnetic marker and measuring a lateral shift amount indicating a relative position in a vehicle width direction with respect to the magnetic marker, the magnetic detecting part is provided at each of two front and rear locations with a predetermined spacing in a longitudinal direction of the vehicle, two magnetic markers are arranged with a spacing as same as the predetermined spacing in a frame of at least one of the parking frame and a vehicle stop frame for the vehicle being forwarded to the parking place, and the position identifying part identify the vehicle orientation with reference to an azimuth connecting the two magnetic markers by the lateral shift amount identified by each magnetic detecting part when two magnetic detecting parts provided in the longitudinal direction of the vehicle detect the two magnetic markers in the frame simultaneously.

18. The automatic parking system according to claim 5, wherein the magnetic detecting part is capable of measuring a relative position of the vehicle in a width direction with respect to the magnetic marker, and at least either one of the magnetic detecting part and the magnetic marker is provided so as to allow an orientation of the vehicle to be identified in accordance with detection of the magnetic marker.

19. The automatic parking system according to claim 18, wherein laying locations of a plurality of the magnetic markers are provided in a discrete manner along the route, and two or more of the magnetic markers are arranged at least any of the laying locations along a direction of the route.

20. The automatic parking system according to claim 19, wherein the magnetic detecting part is provided to the vehicle at each of two or more locations in a longitudinal direction.

* * * * *